United States Patent
Yoshida

(10) Patent No.: US 10,282,141 B2
(45) Date of Patent: May 7, 2019

(54) IMAGE PROCESSING SYSTEM, IMAGE PROCESSING DEVICE, BILLING PROCESSING METHOD AND COMPUTER READABLE RECORDING MEDIUM

(71) Applicant: Konica Minolta, Inc., Chiyoda-ku, Tokyo (JP)

(72) Inventor: Okihisa Yoshida, Kawanishi (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 50 days.

(21) Appl. No.: 14/968,260

(22) Filed: Dec. 14, 2015

(65) Prior Publication Data

US 2016/0098230 A1     Apr. 7, 2016

Related U.S. Application Data

(62) Division of application No. 13/353,714, filed on Jan. 19, 2012, now abandoned.

(30) Foreign Application Priority Data

Jan. 21, 2011 (JP) ................................ 2011-010461

(51) Int. Cl.
    *G06F 3/12*          (2006.01)
    *G06Q 20/10*        (2012.01)
    (Continued)

(52) U.S. Cl.
    CPC ........... *G06F 3/1203* (2013.01); *G03G 21/02* (2013.01); *G06F 3/121* (2013.01); *G06F 3/1224* (2013.01);
    (Continued)

(58) Field of Classification Search
    CPC ....................................................... G06F 3/1203
    (Continued)

(56) References Cited

U.S. PATENT DOCUMENTS

9,275,506 B1 *   3/2016   Whitmore ............. G07F 7/1008
2002/0052754 A1     5/2002   Joyce et al.
(Continued)

FOREIGN PATENT DOCUMENTS

JP        2005-63146 A     3/2005
JP        2005-110126 A    4/2005
(Continued)

OTHER PUBLICATIONS

Office Action dated Apr. 23, 2013 in corresponding Japanese Patent Application No. JP2011-010461, and English translation thereof.

*Primary Examiner* — Cho Kwong
(74) *Attorney, Agent, or Firm* — Buchanan Ingersoll & Rooney PC

(57) ABSTRACT

An image processing system includes an image processing device executing a job and a billing server performing billing process in response to execution of the job connected through a network. The billing server includes: a remaining amount management part for managing a remaining amount of each user's available funds; and a savings amount transmission part for determining a savings amount in the image processing device based on a user's available funds and sending the determined savings amount to the image processing device. The image processing device includes: a savings amount storage part for storing therein the savings amount in accordance with the user; a job execution part for executing a job with an instruction by the user; and a billing processing part for performing billing process to charge to the user in response to execution of the job.

10 Claims, 19 Drawing Sheets

(51) Int. Cl.
*G03G 21/02* (2006.01)
*G06Q 20/14* (2012.01)
*G06Q 20/18* (2012.01)
*H04N 1/00* (2006.01)

(52) U.S. Cl.
CPC .......... *G06F 3/1236* (2013.01); *G06F 3/1239* (2013.01); *G06F 3/1273* (2013.01); *G06Q 20/102* (2013.01); *G06Q 20/145* (2013.01); *G06Q 20/18* (2013.01); *H04N 1/00244* (2013.01); *H04N 1/00838* (2013.01); *H04N 2201/0094* (2013.01)

(58) Field of Classification Search
USPC .......................................................... 705/40
See application file for complete search history.

(56) References Cited

U.S. PATENT DOCUMENTS

| | | | |
|---|---|---|---|
| 2003/0074312 A1* | 4/2003 | White | G06Q 20/102 705/40 |
| 2004/0215566 A1* | 10/2004 | Meurer | G06Q 10/10 705/43 |
| 2004/0233038 A1 | 11/2004 | Beenau et al. | |
| 2007/0229873 A1* | 10/2007 | Kato | G06F 3/1219 358/1.14 |
| 2008/0172332 A1 | 7/2008 | Tsang et al. | |

FOREIGN PATENT DOCUMENTS

| | | |
|---|---|---|
| JP | 2006-202063 A | 8/2006 |
| JP | 2008-40809 A | 2/2008 |
| JP | 2005-146615 A | 6/2008 |

* cited by examiner

IMAGE PROCESSING SYSTEM 1

IMAGE PROCESSING SYSTEM, IMAGE PROCESSING DEVICE, BILLING PROCESSING METHOD AND COMPUTER READABLE RECORDING MEDIUM

This application is a divisional of U.S. application Ser. No. 13/353,714, filed on Jan. 19, 2012, which claims priority to application No. 2011-010461 filed in Japan, the contents of which are hereby incorporated by reference.

BACKGROUND OF THE INVENTION

Field of the Invention

The present invention relates to an image processing system, an image processing device, a billing processing method and a computer readable recording medium. The present invention more specifically relates to a technique of billing in response to execution of a job by the image processing device on the image processing system in which the image processing device and a billing server connected together via a network.

Description of the Background Art

Conventional image processing devices called as MFPs (Multi-function peripherals) bill users in response to execution of jobs. For example, a user who is registered in advance may continue printing with a limited printing method even when the billing amount exceeds the remaining amount at billing process to charge the user. This known technique is introduced for example in Japanese Patent Application Laid-Open No. 2006-202063. According to this technique, it is determined whether or not setting for continuous of printing in excess of available funds is configured when insufficient available funds on an IC card is detected. If the setting is configured, printing is continued with a limited function set in advance.

At recent office environment, a plurality of image processing devices are connected together via a network, and users may use any of them for execution of jobs. In recent years, under such an environment, a billing server for centrally managing a billing amount is installed. The billing server manages an amount of funds available for each user and is capable of establishing data communication with any of the plurality of image processing devices connected together via the network. When a job is executed by one of the image processing devices connected via the network, the billing server establishes data communication with the image processing device, thereby billing a user.

As described above, the billing server connected to the network is configured to manage the plurality of image processing devices to perform billing process to charge to the users. The image processing device, however, may fail to establish data communication with the billing server for example due to occurrence of a problem with the billing server or a network trouble. In such cases, the image processing device may not allow usage by the user without establishment of data communication with the billing server in despite of the sufficient amount of available funds recorded in the billing server.

SUMMARY OF THE INVENTION

The present invention has been made in order to solve the above-described problems. The present invention is intended to provide an image processing system, an image processing device, a billing processing method and a computer readable recording medium with which a job is allowed to be executed by the image processing device even when a problem with a billing server or a network trouble is occurred, so that user friendliness is improved.

First, the present invention is directed to an image processing system comprising an image processing device executing a job and a billing server performing billing process in response to execution of the job in the image processing device. The image processing device and the billing server are connected through a network.

According to one aspect of the image processing system, the billing server in the image processing system includes: a remaining amount management part for managing a remaining amount of funds available for each user; an authentication part for authenticating the user by referring to user information received from the image processing device; and a savings amount transmission part for determining an amount to save in advance in the image processing device based on the remaining amount of available funds of the user who is successfully authenticated with the user authentication by the authentication part and sending the determined savings amount to the image processing device. Further, the image processing device includes: a savings amount storage part for storing therein the savings amount received from the savings amount transmission part in accordance with the authenticated user; a job execution part for executing a job with a job execution instruction by the authenticated user; and a billing processing part for performing billing process to charge to the authenticated user in response to execution of the job by the job execution part. The billing processing part, on failure to establish data communication with the billing server, performs billing process by deducting an amount charged for execution of the job from the saving amount in accordance with the authenticated user in the savings amount storage part.

Second, the present invention is directed to an image processing device connected with a billing server via a network to perform billing process by establishing data communication with the billing server in response to execution of a job.

According to one aspect of the image processing device, the image processing device comprises: a savings amount storage part for obtaining a savings amount from the billing server by user determined based on a remaining amount of the funds available for each user managed by the billing server to store therein; an authentication requesting part for sending user information of the user to the billing server to request authentication and receiving a result of the user authentication from the billing server; a job execution part for executing a job with a job execution instruction by the user successfully authenticated with the user authentication; and a billing processing part for performing billing process to charge to the authenticated user in response to execution of the job by the job execution part. The billing processing part, on failure to establish data communication with the billing server, performs billing process by deducting an amount charged for execution of the job from the savings amount in accordance with the authenticated user in the savings amount storage part.

Third, the present invention is directed to a billing processing method performed in response to execution of a job in an image processing system comprising an image processing device executing a job and a billing server managing a remaining amount of funds available for each user connected via a network.

According to one aspect of the billing processing method, the billing process method comprises the steps of: (a) authenticating the user by referring to user information of the user who uses the image processing device; (b) determining an amount to save in advance in the image processing device based on the remaining amount of funds available for the user who is successfully authenticated with the user authentication and sending the determined savings amount to the image processing device from the billing server; (c) storing the savings amount received from the billing server in accordance with the authenticated user in the image processing device; (d) executing a job in the image processing device with a job execution instruction by the authenticated user; and (e) determining whether or not the image processing device may establish data communication with the billing server in response to execution of the job and performing the billing process by deducting an amount charged for execution of the job from the savings amount in accordance with the authenticated user in the image processing device when data communication with the billing server is failed to be established.

Forth, the present invention is directed to a computer readable recording medium on which a program is recorded executable by an image processing device connected with a billing server via a network. The program causes the image processing device to establish data communication with the billing server to perform billing process in response to execution of a job by the image processing device.

According to one aspect of the computer readable recording medium, the program causes the image processing device to function as a system comprising: a savings amount processing part for obtaining a savings amount determined based on a remaining amount of the funds available for each user managed in the billing server from the billing server and storing the savings amount by user in a storage device; an authentication requesting part for sending user information of the user to the billing server to request authentication and receiving a result of the user authentication from the billing server; a job execution part for executing a job with a job execution instruction by the user successfully authenticated with the user authentication; and a billing processing part for performing billing process to charge to the authenticated user in response to execution of the job by the job execution part. The billing processing part, on failure to establish data communication with the billing server, performs billing process by deducting an amount charged for execution of the job from the savings amount in accordance with the authenticated user in the storage device.

DESCRIPTION OF THE PREFERRED EMBODIMENTS

Figure 1:
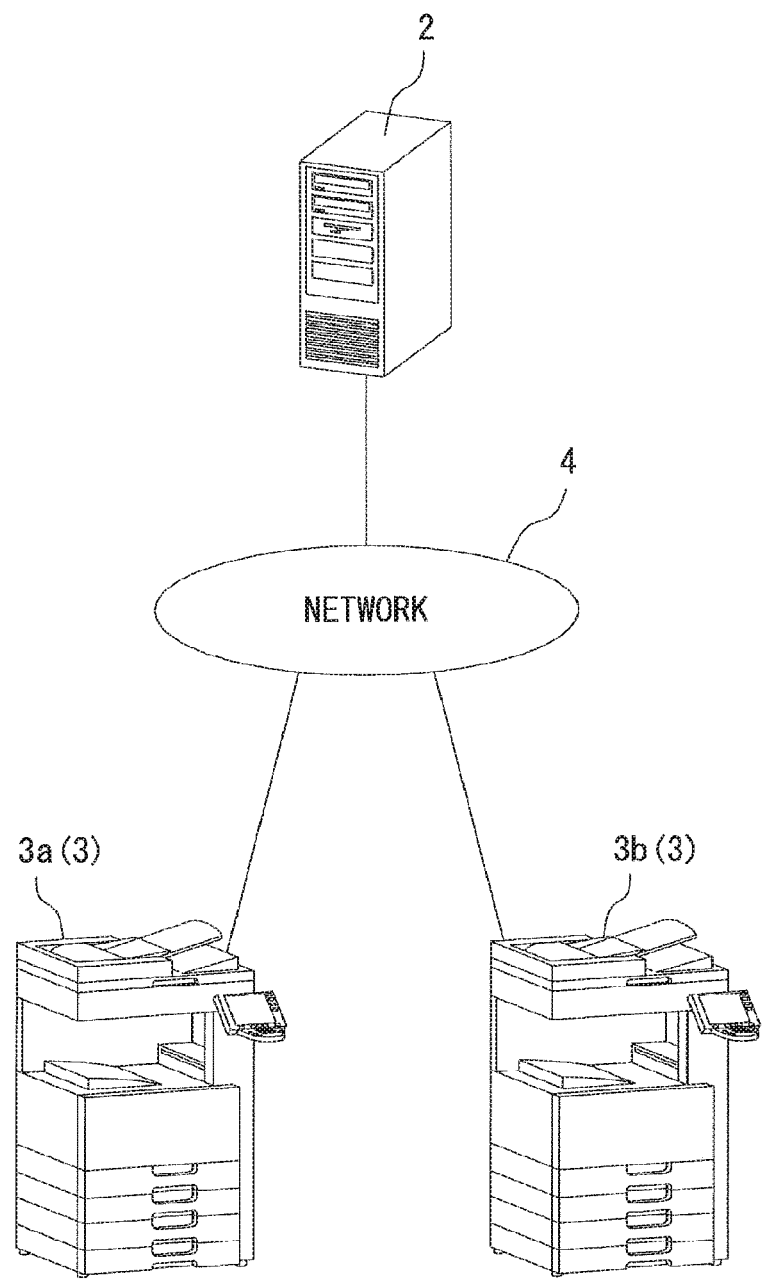
FIG. 1 shows an exemplary configuration of an image processing system.

A preferred embodiment of the present invention is described in detail below with reference to figures. In the description given below, those elements which are shared in common in the preferred embodiment are represented by the same reference numerals, and are not discussed repeatedly for the same description.

FIG. 1 shows an exemplary configuration of an image processing system 1 of the present preferred embodiment. The image processing system 1 established in an environment such as an office, includes a billing server 2 and a plurality of image processing devices 3a and 3b that are connected together via a network 4, in a manner that allows data communication with each other.

The image processing devices 3a and 3b are devices generally called by names such as MFPs, have several functions such as a copy function, a fax function and a scanner function. The image processing devices 3a and 3b execute jobs in accordance with the function selected by a user. In the case of the copy function, a copy job which includes generating an image data by reading a document placed by the user and printing based on the image data is executed. For a job in accordance with the scan function, a scan job which includes generating an image data by reading a document placed by the user to create an electronic file including the image data and transmitting the created file is executed. For a job in accordance with the fax function, a fax job which includes reading the document placed by the user and transmitting by fax is executed. In FIG. 1, two image processing devices 3a and 3b are connected via the network 4. The number of the image processing devices connected via the network 4 is not necessarily two, and it could be one or more than three. When two image processing devices are not necessary to be distinguished, they are called as image processing devices 3, collectively.

The billing server 2 centrally manages the plurality of image processing devices 3 and bills each user for a billing amount required for execution of a job in response to execution of the job by each of the image processing devices 3. The billing server 2 stores therein information of an amount of available funds of each user registered in advance. The value of the funds available for a user is hereafter referred to as "available funds". In response to receipt of a billing request from any of the image processing devices 3, the billing server 2 deducts from the available funds of the user who attempts to execute the job, thereby billing the user.

The network 4 is a communication medium for wired or wireless data communication. The network 4 is, for example, LAN (Local Area Network) established in an environment such as an office. The network 4 may include an external network such as an internet.

In the image processing system 1 described above, one of the image processing devices 3 establishes data communication with the billing server 2 to execute a billing process to charge the billing amount required for execution of the job. With the billing process executed normally, the job is executed by the image processing device 3. In the present preferred embodiment, even when the data communication is failed to be established between the image processing device 3 and the billing server 2, the image processing device 3 executes the job specified by the user, subject to predetermined conditions. Such image processing system 1 is explained more in detail below.

Figure 2:
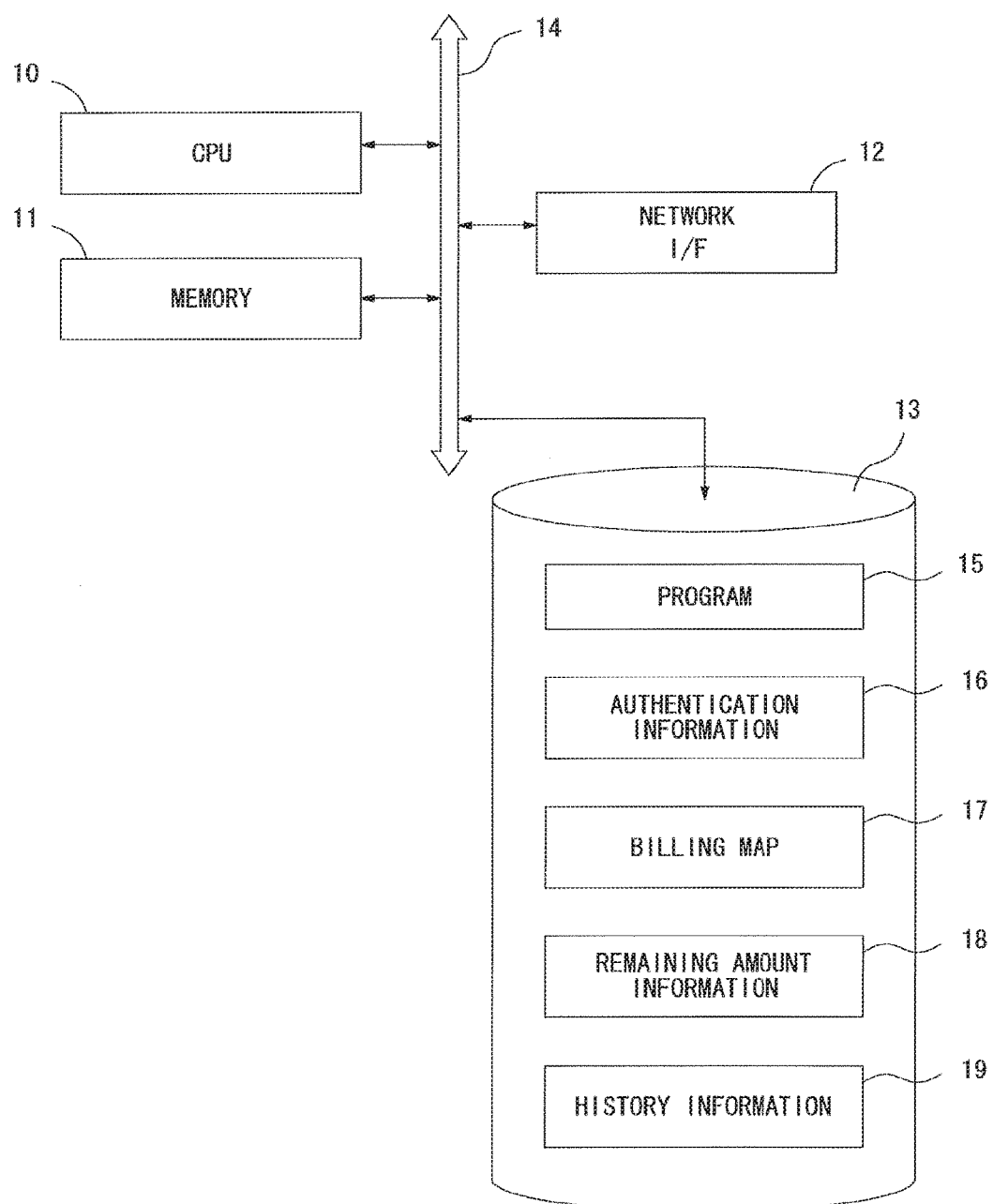
FIG. 2 is a block diagram showing the hardware configuration of a billing server.

FIG. 2 is a block diagram showing the hardware configuration of the billing server 2. As illustrated in FIG. 2, the billing server 2 includes a CPU 10, a memory 11, a network interface 12 and a storage device 13 that are connected together to allow data communication between these parts via a data bus 14. The CPU 10 is a central processing unit which reads and executes a program 15 for the billing server in the storage device 13. The CPU 10 executes the program 15, thereby serving as various types of processing parts described later. The memory 11 stores therein data such as temporary data required when the CPU 10 executes the program 15. The network interface 12 is for connecting the billing server 2 to the network 4. The CPU 10 establishes data communication with the image processing device 3 via the network interface 12. The storage device 13 is a nonvolatile storage device such as a hard disk drive. The storage device 13 stores therein authentication information 16, a billing map 17, remaining amount information 18 and history information 19, along with the program 15 executed by the CPU 10.

Figure 3:
FIG. 3 shows an example of authentication information stored in the billing server.

The authentication information 16 is used when the billing server 2 authenticates a user who uses the image processing device 3. FIG. 3 shows an example of the authentication information 16. As seen in FIG. 3, the authentication information 16 contains information of a user name, a user ID, a password, privileged user information and function restriction information registered for each user. In FIG. 3, information about four users A, B, C and D are registered. The users registered in the authentication information 16 are users who are authorized to use each of the plurality of image processing devices 3 connected via the network 4. The user ID and password are used for authenticating whether or not the user is registered in the authentication information 16. The privileged user information shows whether or not the user has a specific authority, different from general users. If the user is a privileged user, the information shows "YES," and if the user is one of general users, "NO" is shown. By way of example, the users who are holding senior positions such as a division manager and a department chief are registered as the privileged users. The rest of users are registered as the general users. In FIG. 3, the user B is the privileged user. The function restriction information is used for restricting the functions on the image processing device 3 available for each user. In FIG. 3, for example, information restricting full color output is configured for user A. Information restricting fax function is configured for user C and information restricting copy function is configured for user D. No information restricting functions is configured for user B, and all functions on the image processing device 3 are set to be available for user B.

The billing map 17 is used as a standard for calculation of the billing amount to charge the user gave a job execution instruction at execution of the job by the image processing device 3. Unit price of each job to be executed is set in the billing map 17. The billing map 17 may be set for each user.

Figure 4:
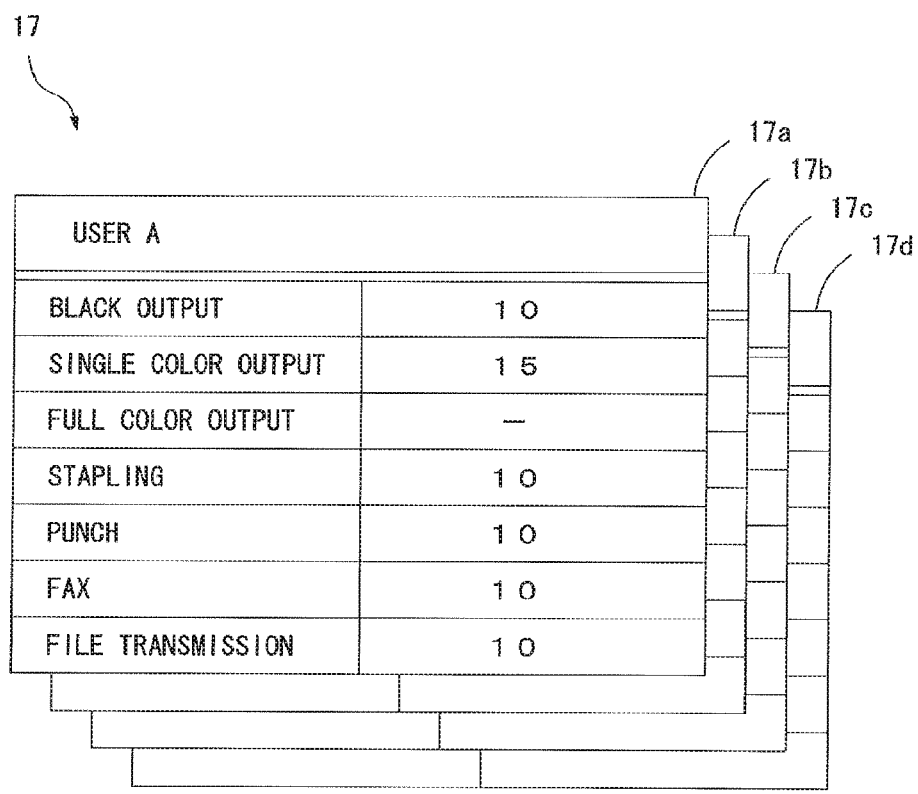
FIG. 4 shows an example of a billing map stored in the billing server.

FIG. 4 shows an example of the billing map 17. The billing map 17 has a plurality of maps 17a, 17b, 17c and 17d of each registered user. Each of the maps 17a, 17b, 17c and 17d corresponds to the respective users A, B, C and D registered in the authentication information 16. According to the billing map 17a of user A, user A is charged 10 yen for copying one paper in black and white and 15 yen for copying one paper in full color. Information of unit prices is set for each function available for user A in the billing map 17a of user A as well as for copy. The billing maps 17b, 17c and 17d of the respective users B, C and D are the same as the billing map 17a of user A, but some of the unit prices set for each job may be different for the respective users.

Figure 5:
FIG. 5 is an example of remaining amount information managed by the billing server.

The remaining amount information 18 is information in which the remaining amount of available funds is stored for each user who is authorized to use the image processing device 3. FIG. 5 is an example of the remaining amount information 18. The remaining amount information 18 contains information of the remaining amount of available funds and percentage of an amount to save registered for each user in the authentication information 16. The amount of available funds of each user is set in advance by users holding senior positions such as the division manager and the department chief, and the billing amount required for execution of the job is deducted from the available funds in response to each execution of the job in the image processing device 3 by the user. The billing server 2 manages the remaining amount of each user's available funds one by one, thereby managing billing. The information relating to percentage of savings amount is also set by users holding senior positions. The percentage of savings amount indicates the percentage to determine the amount to save in each of the image processing devices 3 of the remaining amount of available funds and is set in advance for each user as ratio to the remaining amount of available funds. By referring to FIG. 5, the percentages of savings amount for user A, C and D are set 5%, whereas for user B is 10%.

Figure 6:
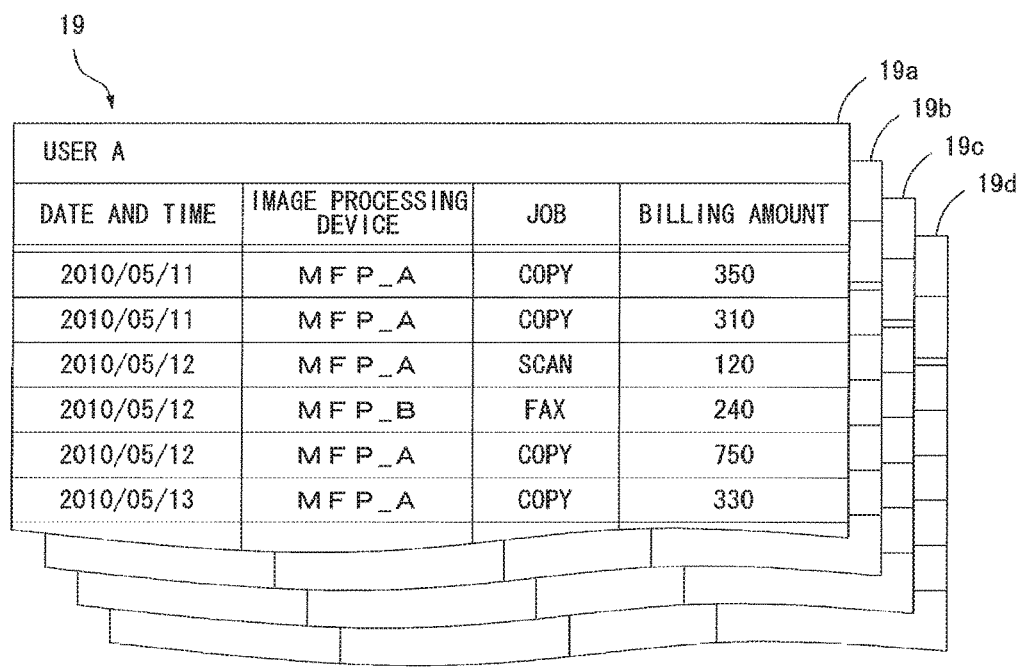
FIG. 6 is an example of history information stored in the billing server.

The history information 19 is updated in response to execution of the job by each of the image processing devices 3 and is information in which job execution history and billing history is recorded for each user. FIG. 6 is an example of the history information 19. The history information 19 includes a plurality of history information 19a, 19b, 19c and 19d of each user registered in the authentication information 16. The history information 19a, 19b, 19c and 19d corresponds to the respective users A, B, C and D registered in the authentication information 16. By way of example, as seen in FIG. 6, date and time of execution of the job, information to determine the image processing device 3 executed the job, information indicating the executed job and an billing amount charged for execution of the job are recorded in the history information 19a of user A. It is the same for the history information 19b, 19c and 19d of the respective users B, C and D.

Figure 7:
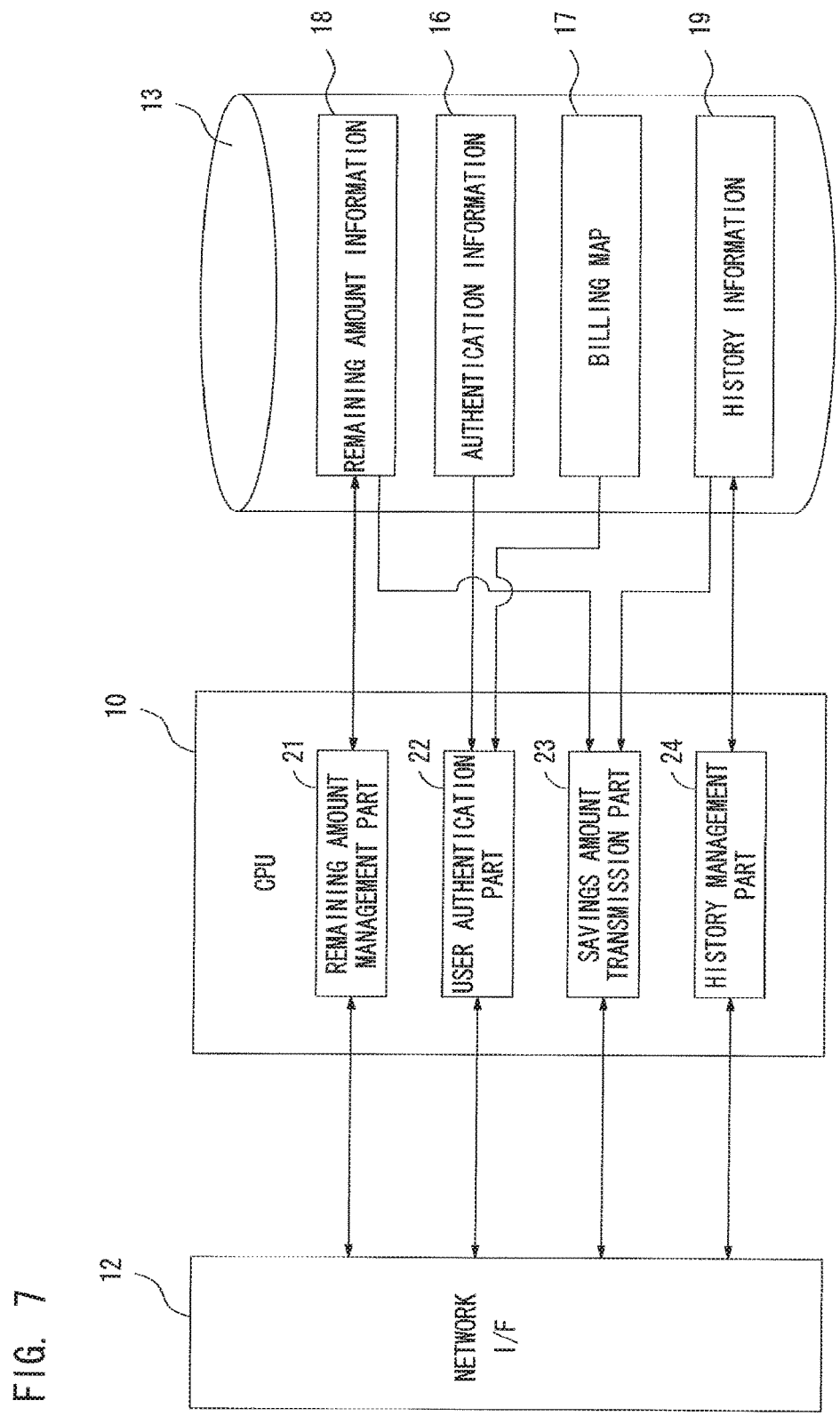
FIG. 7 is a block diagram showing an exemplary functional configuration of a CPU in the billing server.

The functional configuration realized by execution of the program 15 by the CPU 10 of the billing server 2 is explained next. FIG. 7 is a block diagram showing an exemplary functional configuration of the CPU 10 in the billing server 2. As shown in FIG. 7, the CPU 10 of the billing server 2 serves as a remaining amount management part 21, a user authentication part 22, a savings amount transmission part 23 and a history management part 24.

The remaining amount management part 21 manages the amount of available funds of each user registered in the remaining amount information 18 and bills the user by deducting the billing amount charged for the job to be executed in the respective image processing devices 3 from the remaining amount of available funds of the user.

The user authentication part 22 manages the authentication information 16. In response to receipt of user information containing user ID and password from any of the image processing devices 3, the user authentication part 22 determines whether or not information matching the received user information is registered in the authentication information 16 to perform user authentication. The user authentication part 22 sends a result of the user authentication to the image processing device 3, the originator of the user information. As one of the users is determined as a logged-in user due to the user authentication resulted in success, the user authentication part 22 generates an authentication result containing information indicating whether or not the logged-in user is the privileged user and function restriction information set for the logged-in user to transmit the generated authentication result to the image processing device 3. The user authentication part 22 also reads information relating to the billing map set for the logged-in user in the billing map 17 in the storage device 13 to transmit to the image processing device 3 when the user authentication results in success.

The savings amount transmission part 23 is put into operation in response to receipt of a request to send the savings amount from any of the image processing devices 3. The savings amount transmission part 23 reads the remaining amount of available funds of the logged-in user in the remaining amount information 18 and determines the amount to save in advance in the image processing device 3 based on the read remaining amount of available funds. The savings amount transmission part 23 then sends the determined savings amount to the image processing device 3. After sending the savings amount to the image processing device 3, the savings amount transmission part 23 deducts the savings amount thereby sent from the remaining amount of available funds of the logged-in user to update the remaining amount information 18. The way how the savings amount transmission part 23 determines the savings amount is described later.

With execution of the job by the image processing device 3, the history management part 24 updates the history information 19 in the storage device 13 in accordance with the history information received from the image processing device 3.

Figure 8:
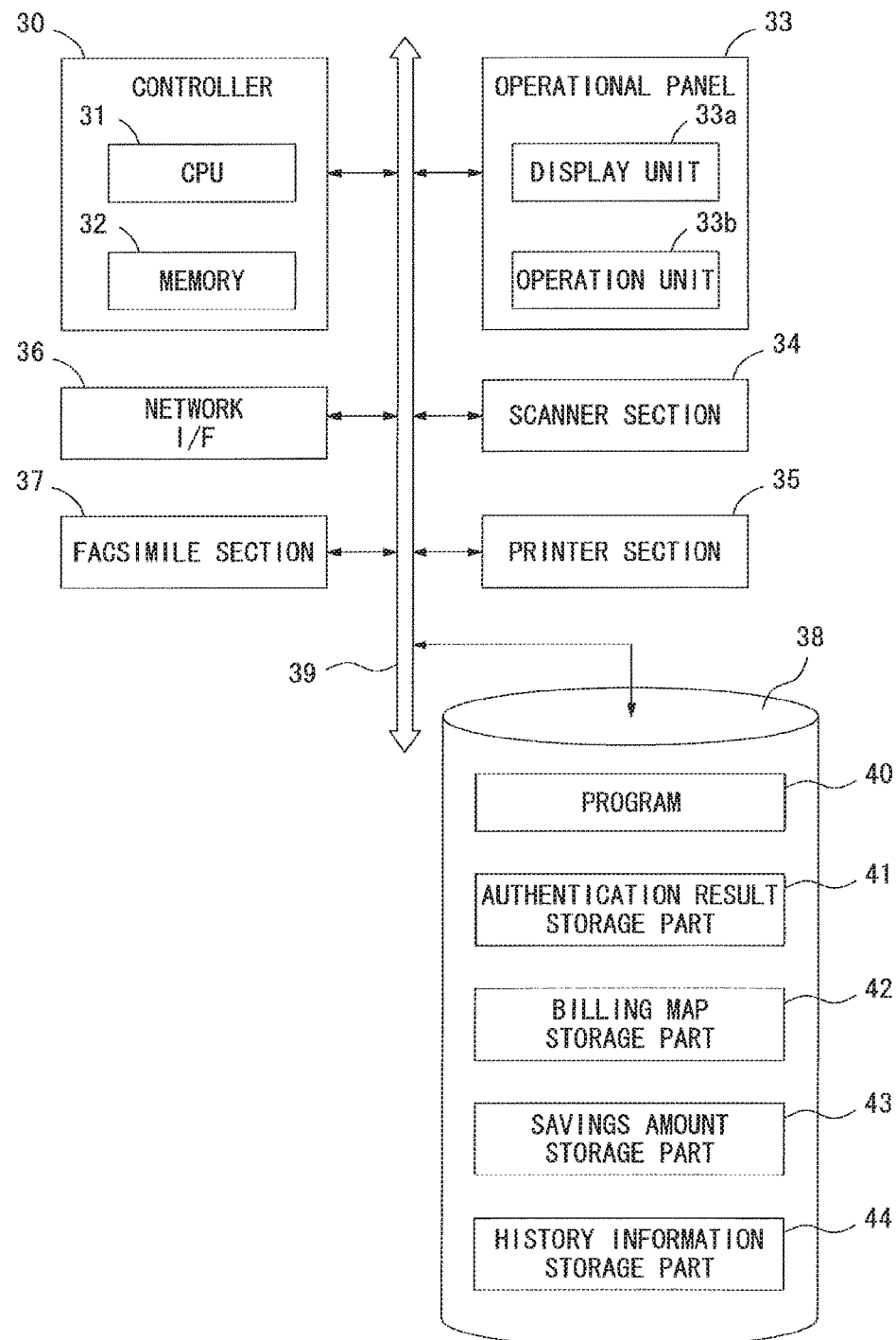
FIG. 8 is a block diagram showing an exemplary hardware configuration of an image processing device.

FIG. 8 is a block diagram showing an exemplary hardware configuration of the image processing device 3. As shown in FIG. 8, the image processing device 3 includes a controller 30, an operational panel 33, a scanner section 34, a printer section 35, a network interface 36, a facsimile section 37 and a storage device 38. These components are connected together via a data bus 39 in a manner that allows data input and output to and from each component.

The controller 30 includes a CPU 31 and a memory 32. The CPU 31 reads and executes a program 40 in the storage device 38, so that the controller 30 is capable of controlling operation of each part. The memory 32 stores therein data such as required temporal data when the CPU 31 executes the program 40.

The operational panel 33 is a user interface for the users to use the image processing device 3. The operational panel 33 includes a display unit 33a for displaying various types of information to the users, and an operation unit 33b through which the users make variety of entries. The user information such as user ID and password is entered through the operational panel 33 by the users who use the image processing device 3. As the logged-in user being identified as a result of user authentication, the operational panel 33 receives logged-in user's operation to select a job or to configure the detailed settings of the selected job and logged-in user's operation to give a job execution instruction.

The scanner section 34 generates image data by reading documents placed thereon by the user. The scanner section 34 is put into operation for the jobs such as a copy job, a scan job or a facsimile job selected by the logged-in user. As execution of the job is started with the logged-in user's operation to give the job execution instruction, the scanner section 34 reads documents and generates image data.

The printer section 35 produces a printed output by forming an image on a printing medium such as a sheet based on the received image data. The printer section 35 is put into operation when the jobs such as the copy job require production of the printed output are selected by the logged-in user. For the copy job as an example, the scanner section 34 reads documents and generate image data as described above with the logged-in user's operation to give a job execution instruction. The printer section 35 thereafter obtains the image data generated by the scanner section 34 to produce a printed output. The printer section 35 is capable of producing the printed output in any of black and white, single color and full color and is capable of providing finishing processing such as stapling or punching, so as to produce the printed output in accordance with the settings configured by the logged-in user.

The network interface 36 is responsible for connecting the image processing device 3 to the network 10. The controller 30 establishes data communication with the billing server 2 via the network interface 36.

The facsimile section 37 transmits and receives facsimile data. The facsimile section 37 is put into operation for the jobs such as the facsimile job selected by the logged-in user to generate facsimile data based on the image data of documents read by the scanner section 34 and send to an address designated by the logged-in user.

The storage device 38 is a nonvolatile storage device such as a hard disk drive. The storage device 38 stores therein the program 40 for image processing device executed by the CPU 11 and is provided with an authentication result storage part 41, a billing map storage part 42, a savings amount storage part 43 and a history information storage part 44 as storage regions to store various types of data.

As the logged-in user is identified due to user authentication resulted in success by the billing server 2, information about the logged-in user is stored in the authentication result storage part 41. The information stored in the authentication result storage part 41 includes information such as logged-in user's user ID, password, that indicating whether or not the user is privileged user and that of function restriction. The image processing device 3, with the above-described information stored thereby in the authentication result storage part 41, is capable of executing user authentication by referring to the information in the authentication result storage part 41 even when it, for instance, fails to establish data communication with the billing server 2.

The billing map storage part 42 stores therein the billing map of each user received from the billing server 2. The savings amount storage part 43 stores therein the savings amount of each user received from the billing server 2. The history information storage part 44 stores therein job execution history and billing history in accordance with the logged-in user in response to execution of the job based on the logged-in user's operation to give the job execution instruction.

Figure 9:
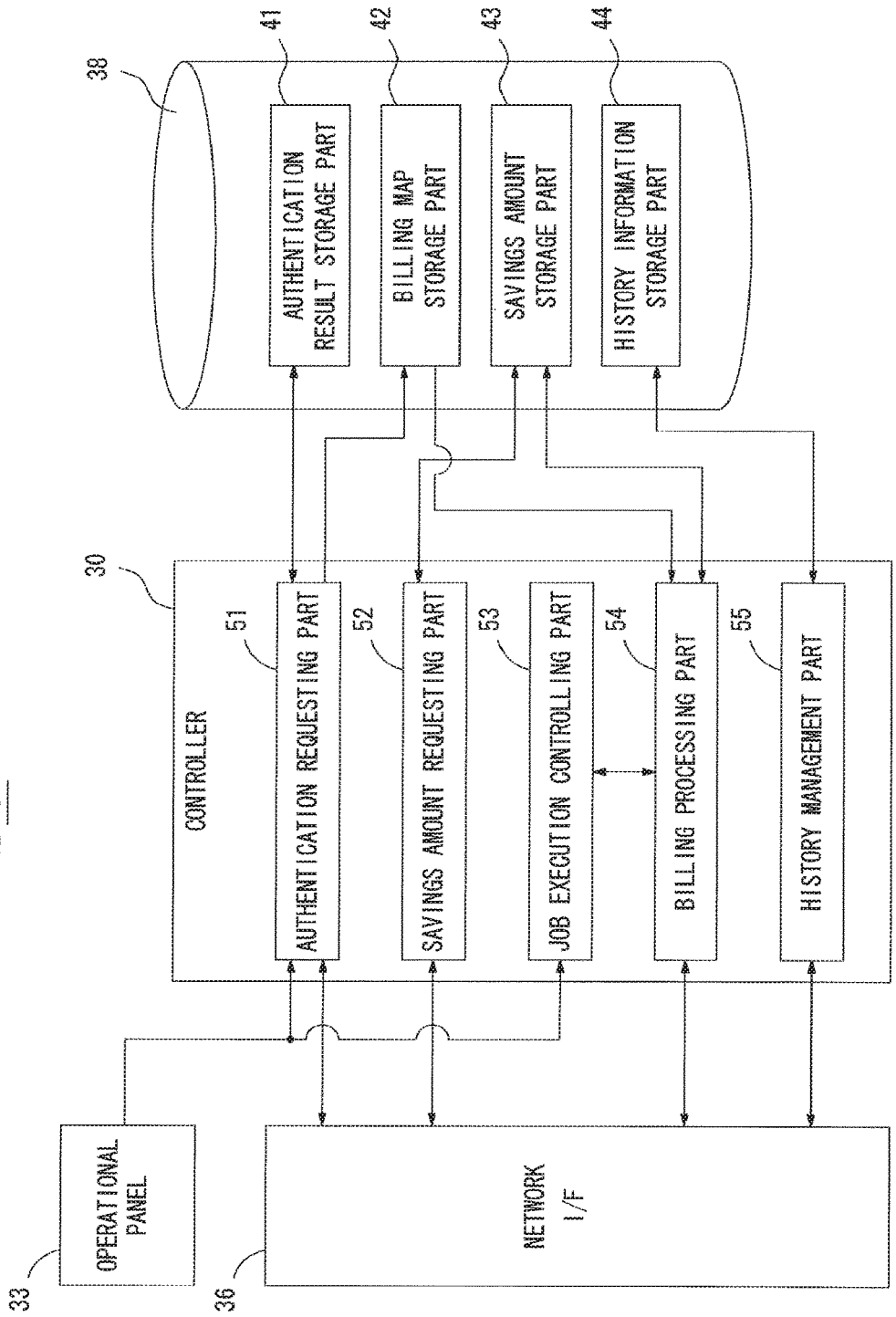
FIG. 9 is a block diagram showing an exemplary functional configuration of a controller in the image processing device.

The functional configuration of the controller 30 realized by execution of the program 40 by the CPU 31 in the controller 30 of the image processing device 3 is described next. FIG. 9 is a block diagram showing an exemplary functional configuration of the controller 30 in the image processing device 3. As shown in FIG. 9, the CPU 31 executes the program 40 so that the controller 30 serves as an authentication requesting part 51, a savings amount requesting part 52, a job execution controlling part 53, a billing processing part 54 and a history management part 55.

The authentication requesting part 51 sends an authentication request by sending a combination of the user ID and password received through the operational panel 3 as the user information to the billing server 2 to identify the user who uses the image processing device 3. The authentication requesting part 51 receives an authentication result from the billing server 2 after sending the user information to the billing server 2 and determines whether or not the user authentication results in success based on the received authentication result. When the user authentication results in success, the authentication requesting part 51 stores the information about the logged-in user in the authentication result storage part 41 and puts the image processing device 3 into a logged-in state. Further, when the user authentication performed by the billing server 2 results in success, the authentication requesting part 51 obtains the billing map set for the logged-in user from the billing server 2. The authentication requesting part 51 then stores the obtained billing map in accordance with the logged-in user in the billing map storage part 42.

The authentication requesting part 51 does not always receive the authentication result from the billing server 2 in the predetermined period of time after sending the authentication request containing the user information to the billing server 2. The authentication requesting part 51 does not receive the authentication result from the billing server 2, for example, because of a network trouble or the billing server 2 failure. In such a case, the authentication requesting part 51 refers to the information stored in advance in the authentication result storage part 41 to execute user authentication without data communication with the billing server 2 so that the user may continue using the image processing device 3. To be more specific, when a combination of the user ID and password received through the operational panel 33 is stored in the authentication result storage part 41, the authentication requesting part 51 determines that the authentication results in success and identifies the user in accordance with the user ID and password as the logged-in user. The image processing device 3 is put into a logged-in state using the information stored in advance in the authentication result storage part 41.

The savings amount requesting part 52 requests the savings amount for the logged-in user to the billing server 2 and stores the savings amount received from the billing server 2 in accordance with the logged-in user in the savings amount storage part 43. The savings amount requesting part 52 obtains the savings amount regarding the user from the billing server 2 to store in the savings amount storage part 43 when the user logged in for the first time right after the installation of the image processing device 3. When the image processing device 3 executes the job while data communication with the billing server 2 is available, the savings amount requesting part 52 executes a process to update the savings amount in the savings amount storage part 43, along with execution of the job. In the updating process, the savings amount stored in the savings amount storage part 43 at the time of the process is once returned to the billing server 2, and then a savings amount received from the billing server 2 is newly stored in the savings amount storage part 43 after return.

The job execution controlling part 53 controls execution of the job specified by the logged-in user. The job execution controlling part 53 configures settings regarding the job based on the information received through the operational panel 33 and controls operation of the processing parts such as the above-described scanner section 34, the printer section 35 and the facsimile section 37 to execute the specified job after the image processing device 3 is put into the logged-in state.

The billing processing part 54 performs a billing process to charge the logged-in user together with the job execution controlling part 53 with execution of the job by the job execution controlling part 53. To be more specific, the billing processing part 54 reads the billing map of the logged-in user in the billing map storage part 42 to calculate a billing amount charging for execution of the job based on the information such as settings of the job. The billing processing part 54 then sends the billing amount to the billing server 2 to perform the billing process.

After the data communication is established between the image processing device 3 and the billing server 2, the billing process in the billing server 2 is performed normally. In response to receipt of a completion report of normal billing from the billing server 2, the billing processing part 54 completes the billing process and allows the job execution controlling part 53 to execute the job.

If data communication between the image processing device 3 and the billing server 2 is failed to be established, the billing process in the billing server 2 is not performed normally. In this case, the billing processing part 54 receives no information from the billing server 2, so it determines that data communication is failed to be established after predetermined period of time from sending the billing amount. The billing processing part 54 performs the billing process to charge to the savings amount if the logged-in user's savings amount in the savings amount storage part 43 exceeds the billing amount. To be more specific, when the logged-in user's savings amount is equal to or exceeds the billing amount, the billing processing part 54 deducts the billing amount from the savings amount to update the savings amount and allows the job execution controlling part 53 to execute the job. When the logged-in user's savings amount is less than the billing amount, the billing processing part 54 restricts the job execution controlling part 53 to execute the job.

In the present preferred embodiment, however, for the logged-in user who is a privileged user, the billing processing part 54 is configured to deduct the billing amount from the savings amount to update the savings amount and allow the job execution controlling part 53 to execute the job even when the savings amount of the privileged user is less than the billing amount charged for the job. So, the privileged user is allowed to use the image processing device 3 for execution of the job even in a situation that only small savings amount is left for the user.

The history management part 55 generates job execution history and billing history and stores in the history information storage part 44 in response to execution of the job by the job execution controlling part 53. The history management part 55 also sends the history information generated with execution of the job to the billing server 2.

Figure 10:
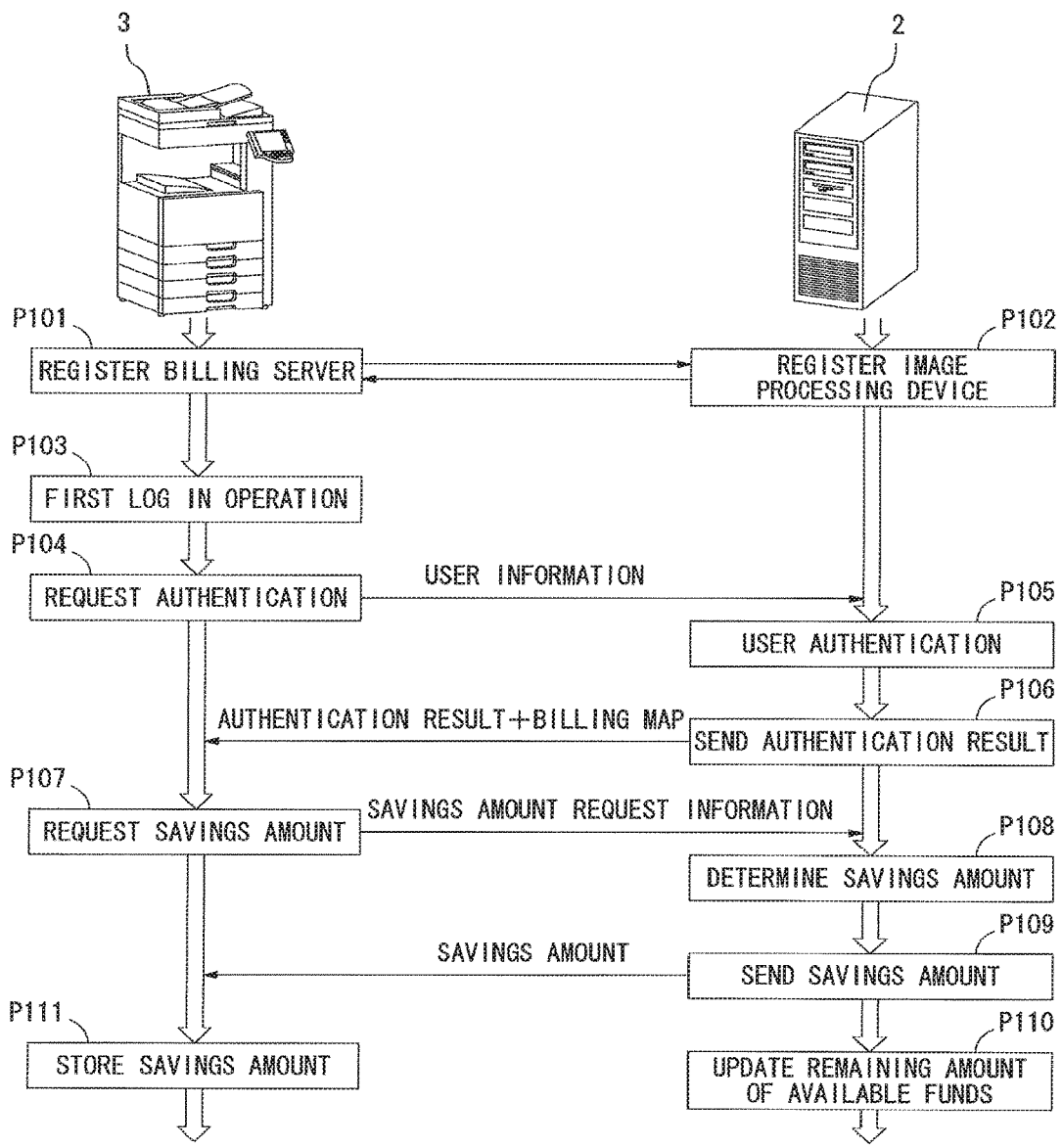
FIG. 10 is a view showing a frame format of a process flow between the image processing device and the billing server after the new image processing device is installed on the image processing system.

The operation in the image processing system 1 configured as described above is explained next. FIG. 10 is a view showing a frame format of a process flow between the image processing device 3 and the billing server 2 after the new image processing device 3 is installed on the image processing system 1. After being installed on the image processing system 1 as shown in FIG. 10, the new image processing device 3 registers therewith the billing server 2 to communicate with each other (process P101). The image processing device 3 then establishes data communication with the billing server 2, so that the billing server 2 registers therewith the new image processing device 3 to manage (process P102).

As the user performs the log-in operation on the new image processing device 3 for the first time (process P103), the image processing device 3 sends the user information containing the user ID and password to the billing server 2 to request authentication (process P104). The billing server 2 receives the user information, and executes user authentication (process P105), so as to send an authentication result to the image processing device 3 (process P106). If the user authentication results in success and the logged-in user (authenticated user) may be identified, the billing server 2 sends the authentication result containing the information about the logged-in user to the image processing device 3, along with the billing map set for the logged-in user.

The image processing device 3 which thus could identify the logged-in user who performed the log-in operation for the first time then sends the savings amount request information to the billing server 2 to store the savings amount for the logged-in user (process P107). After receiving the savings amount request information, the billing server 2 performs a process to determine the amount to save in the image processing device 3 based on the logged-in user's available funds (process P108), and sends the determined amount to the image processing device 3 (process P109).

As the new image processing device 3 being logged in for the first time, the billing server 2 calculates an upper limit of the logged-in user's savings amount and determines the upper limit of savings amount as the amount to save. The upper limit of savings amount is the maximum amount that may be saved up in one of the image processing devices 3 for the logged-in user, and is calculated depends on the remaining amount of logged-in user's available funds and percentage of remaining amount of savings contained in the remaining amount information 18. The billing server 2 multiplies the logged-in user's available funds by the percentage of remaining amount of savings, thereby calculating the upper limit of savings amount and determining the calculated upper limit of savings amount as the amount to save at the first log-in. The calculation of the savings amount is performed by the above-described savings amount transmission part 23.

The billing server 2 deducts the savings amount from the logged-in user's available funds and updates the remaining amount of logged-in user's available funds recorded in the remaining amount information 18 (process P110). The image processing device 3 receives the savings amount from the billing server 2 and stores the savings amount in accordance with the logged-in user in the savings amount storage part 43 (process P111).

In the present preferred embodiment, after the user logs into the image processing device 3 by performing the log-in operation on the image processing device 3, the savings amount corresponding to the logged-in user is sent to the image processing device 3 from the billing server 2 at the log-in operation. The image processing device 3 stores the savings amount in accordance with the logged-in user in order for it to perform the billing process even when a network trouble is occurred or the billing server 2 goes down.

Figure 11:
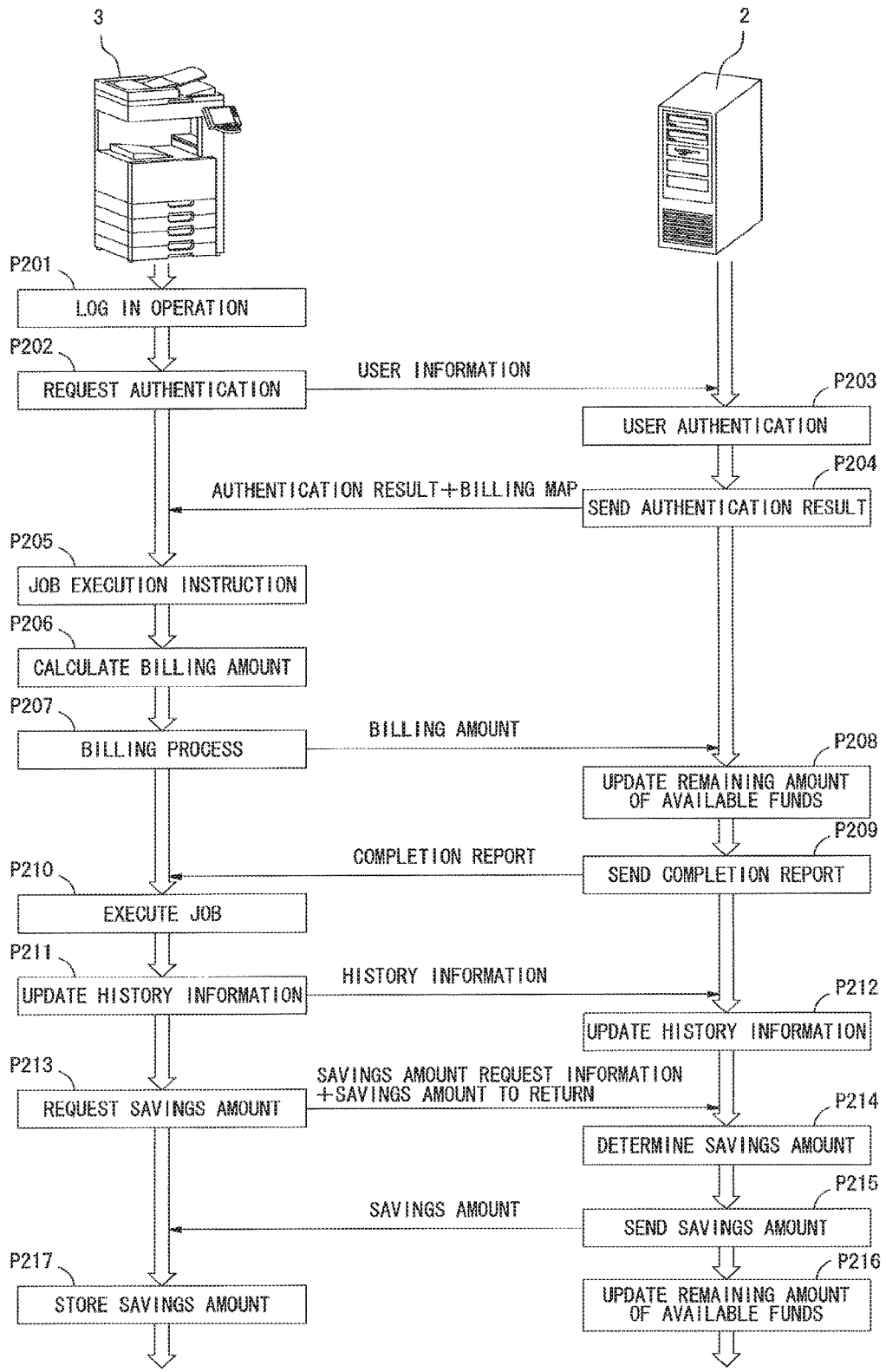
FIG. 11 is a view showing a frame format of a process flow between the image processing device and the billing server when data communication between the image processing device and the billing server is established normally.

FIG. 11 is a view showing a frame format of a process flow between the image processing device 3 and the billing server 2 when data communication between the image processing device 3 and the billing server 2 is established normally after the first log-in operation is performed by each user. As shown in FIG. 11, in response to the log-in operation performed by the user who tries to use the image processing device 3 (process P201), the image processing device 3 sends the user information entered by the user to the billing server 2 to request the authentication (process P202). The billing server 2 performs the user authentication in response to the authentication request (process P203) and sends the authentication result to the image processing device 3 (process P204). If the user authentication results in success to identify the logged-in user, the billing server 2 sends the authentication result containing the information about the logged-in user to the image processing device 3, along with the billing map set for the logged-in user. The image processing device 3 stores again the information in the storage device 38 and is put into the logged-in state in which the logged-in user is logging in.

After detecting the job execution instruction by the logged-in user (process P205), the image processing device 3 refers to the billing map corresponding to the information such as settings of the job configured by the logged-in user to calculate the billing amount charged for execution of the job (process P206). The image processing device 3 then performs the billing process and sends the billing amount to the billing server 2 (process P207).

Following upon the receipt of the billing amount from the image processing device 3, the billing server 2 deducts the billing amount from the logged-in user's available funds and updates the remaining amount of available funds (process P208). The billing server 2 sends a completion report indicating that the billing process is complete normally to the image processing device 3 after the update process of the remaining amount of available funds is complete (process P209). Thus, the image processing device 3 is enabled to be notified the normal completion of the billing process in the billing server 2. The image processing device 3 then allows the execution of the job to execute the job specified by the logged-in user (process P210).

The image processing device 3 generates new history information and updates the history information (process P211). In this process, the image processing device 3 sends the history information to the billing server 2, besides updating the history information in the history information storage part 44. Upon the receipt of the history information from the image processing device 3, the billing server 2 updates the history information 19 in the storage device 13 based on the received history information (process P212).

The image processing device 3 sends savings amount request information to the billing server 2 after completion of execution of the job in order for the remaining amount of logged-in user's savings to be updated (process P213). The savings amount request information sent to the billing server 2 from the image processing device 3 contains information to return the remaining amount of savings stored in the image processing device 3 at the point of a time to the billing server 2.

The billing server 2 adds the remaining amount of savings returned from the image processing device 3 to the remaining amount of logged-in user's available funds and performs a process to determine again the amount to save in the image processing device 3 based on the remaining amount of available funds (process P214). Further, the billing server 2 sends the determined savings amount to the image processing device 3 (process P215).

In this process, the billing server 2 calculates the savings amount based on the history information 19 of the logged-in user. More specifically, the billing server 2 designates the job the most executed by the logged-in user as a priority job by referring to the history information 19 of the logged-in user, and calculates average usage amount of the priority job. By way of example, in accordance with the history information 19 of the logged-in user, when the number of execution of the copy job is the most, the copy job is designated as the priority job. The average amount of the past billing amount of the copy job is calculated as the average usage amount. The billing server 2 then determines whether or not the image processing device 3, the originator of the savings amount request information, is regularly used by the logged-in user by referring to the history information 19 of the logged-in user. The image processing devices 3 recorded in the history information 19 of the logged-in user are identified as two different types, "preferred device" and "non-preferred device". The preferred device is a regular device the most used by the logged-in user, and the non-preferred device is one or more devices other than the preferred device.

When the image processing device 3 is the "preferred device," the billing server 2 determines the savings amount equivalent to five times amount of the billing amount the same as the average usage amount. So, the savings amount is the amount that makes the job to be executed five times. By way of example, when the average usage amount of the priority job by the logged-in user is 350 yen, the savings amount for the preferred device is 1750 yen. In contrast, when the image processing device 3 is the "non-preferred device," the billing server 2 determines the savings amount equivalent to twice amount of the billing amount the same as the average usage amount. So, the savings amount is the amount that makes the job to be executed twice. When, for example, the average usage amount of the priority job by the logged-in user is 350 yen, the savings amount for the non-preferred device is 700 yen.

For the savings amount thus calculated exceeding the upper limit of savings amount generated by multiplying the remaining amount of logged-in user's available funds by the percentage of remaining amount of savings, the billing server 2 determines the upper limit of savings amount as the amount to save in the image processing device 3. This calculation is performed by the above-described savings amount transmission part 23.

The billing server 2 deducts the amount the same amount to the savings amount sent to the image processing device 3 from the amount of the logged-in user's available funds and updates the remaining amount of logged-in user's available funds recorded in the remaining amount information 18 (process P216). After receiving the savings amount from the billing server 2, the image processing device 3 stores the savings amount in accordance with the logged-in user in the savings amount storage part 43 (process P217).

In the present preferred embodiment, the stored savings amount in accordance with the logged-in user is updated in response to every execution of the job with the logged-in user's instruction by the image processing device 3. However, the update process is not required to be performed every execution of the job, so it may be performed once in a predetermined number of execution, for example.

Figure 12:
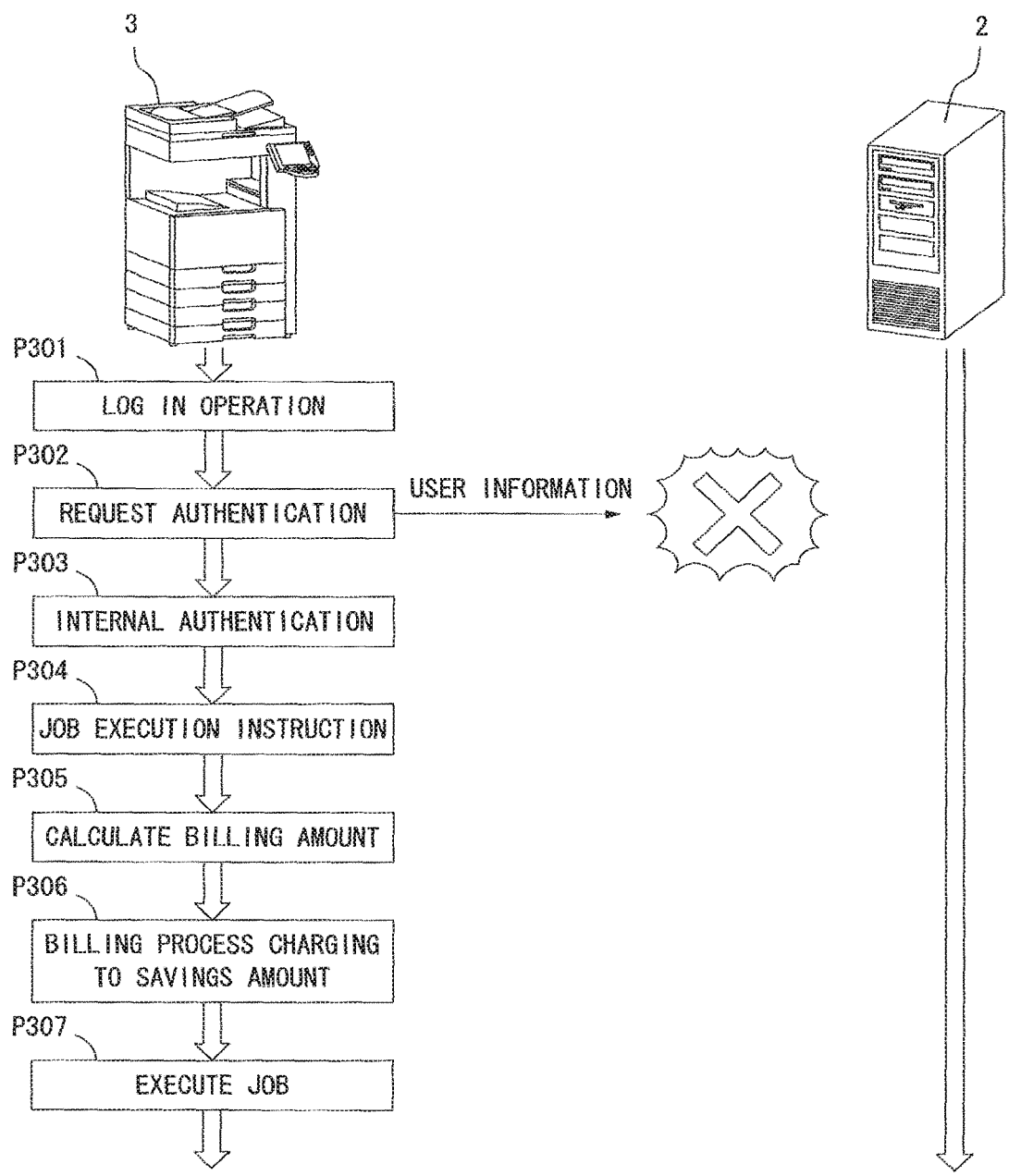
FIG. 12 is a view showing a frame format of a process flow between the image processing device and the billing server when data communication between the image processing device and the billing server is failed to be established normally.

Next, a process flow when data communication between the image processing device 3 and the billing server 2 may not be established is explained. FIG. 12 is a view showing a frame format of a process flow between the image processing device 3 and the billing server 2 when data communication between the image processing device 3 and the billing server 2 is failed to be established normally. As shown in FIG. 12, in response to the log-in operation performed by the user who tries to use the image processing device 3 (process P301), the image processing device 3 sends the user information entered by the user to the billing server 2 to request authentication (process P302). The billing server 2 is sometimes not allowed to establish data communication with the image processing device 3 due to a network trouble or a problem with the billing server 2. In such a situation, the image processing device 3 performs internal authentication by referring to the information in the authentication result storage part 41 (process P303). The internal authentication results in success to identify the logged-in user puts the image processing device 3 into the logged-in state in which the logged-in user is logging in.

After detecting the job execution instruction by the logged-in user (process P304), the image processing device 3 refers to the billing map corresponding to the information such as settings of the job configured by the logged-in user to calculate the billing amount for execution of the job (process P305). The image processing device 3 then performs the billing process to charge to the logged-in user's savings amount in the savings amount storage part 43 (process P306). When the remaining amount of logged-in user's savings exceeds the billing amount, the billing amount is deducted from the savings amount and the remaining amount of savings is updated. The execution of the job is then allowed. When the remaining amount of savings is less than the billing amount, the execution of the job is usually restricted, besides the logged-in user is the privileged user. For the privileged user, the billing process is performed and the execution of the job is allowed. The image processing device 3 then determines whether or not the billing process to charge to the savings amount is complete normally and executes the job specified by the logged-in user (process P307).

Thus in the present preferred embodiment, the job may be executed using the savings amount received from the billing server 2 and saved in advance even when establishment of the data communication between the image processing device 3 and the billing server 2 is failed. The job may be executed by the image processing device 3 even in an occurrence of a problem with the billing server 2 or a network trouble, so the user friendliness can be improved.

Figure 13:
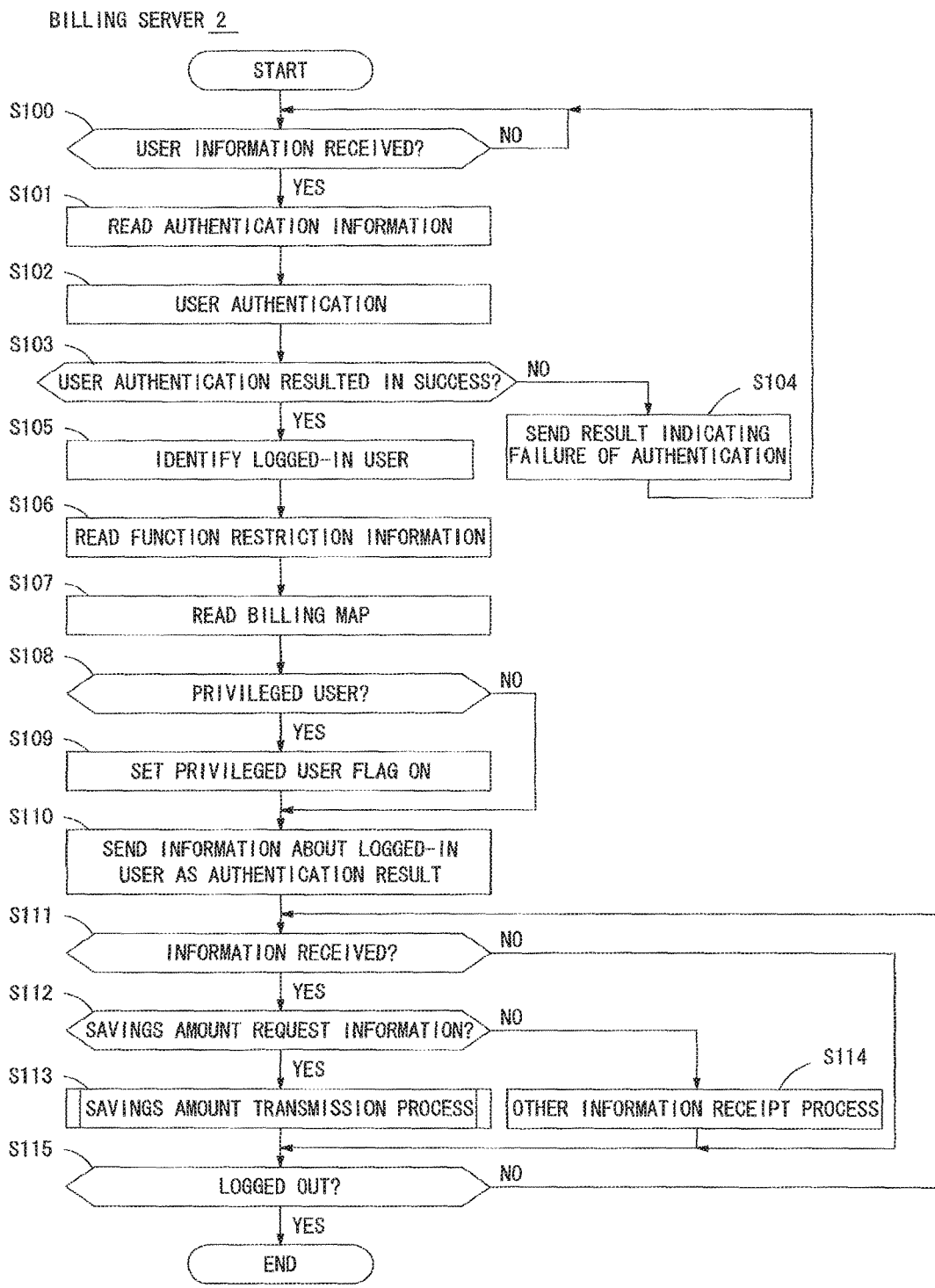
FIG. 13 is a flow diagram explaining an exemplary main procedure of a process performed by the billing server.

Next, operation of the billing server 2 is explained. FIG. 13 is a flow diagram explaining an exemplary main procedure of a process performed by the billing server 2. The process is performed in response to execution of the program 15 by the CPU 10 of the billing server 2. As shown in FIG. 13, upon start of this process, the billing server 2 is put into a waiting state until receiving the user information for the user authentication from the image processing device 3 (step S100). The billing server 2 receives the user information (when a result of step S100 is YES), and reads the authentication information 16 (step S101). The billing server 2 then cross-checks a combination of the user ID and password in the received user information with the information registered in the authentication information to perform user authentication (step S102). The billing server 2 then determines whether or not the user authentication results in success (step S103) and sends the authentication result indicating failure of authentication to the image processing device 3 (step S104) when the user authentication results in failure (when a result of step S103 is NO). The billing server 2 returns to step S100.

When the user authentication results in success (when a result of step S103 is YES), the billing server 2 identifies the logged-in user trying to use the image processing device 3 (step S105) and reads the function restriction information set for the logged-in user in the authentication information 16 (step S106). The billing server 2 further reads the billing map set for the logged-in user in the billing map 17 in the storage device 13 (step S107). The billing server 2 determines whether or not the identified logged-in user is the privileged user (step S108). If he or she is the privileged user (when a result of step S108 is YES), the privileged user flag is set on (step S109). The privileged user flag is normally off, so it is kept off if the logged-in user is not the privileged user (when a result of step S108 is NO).

The billing server 2 sends the information about the logged-in user as the authentication result to the image processing device 3 (step S110). The information sent in step S110 contains the function restriction information, the billing map and the privileged user flag set for the logged-in user. The receipt of the information from the billing server 2 allows the image processing device 3 to identify the logged-in user and to specify the function restriction in use of the image processing device 3 by the logged-in user. Further, the image processing device 3 is allowed to determine the billing amount to charge the logged-in user for execution of the job and to determine whether or not the logged-in user is the privileged user.

After sending the authentication result to the image processing device 3, the billing server 2 determines whether or not any information is received from the image processing device 3 (step S111). As some kind of information is received from the image processing device 3 (step S111), the billing server 2 determines whether or not the information thereby received is the savings amount request information (step S112). When the information received from the image processing device 3 is the savings amount request information (when a result of step S112 is YES), the billing server 2 performs the savings amount transmission process (step S113). The billing server 2 performs the savings amount transmission process, thereby determining in advance the amount to save in the image processing device 3 and sending the savings amount to the image processing device 3. The detail of the savings amount transmission process is described later.

When the information received from the image processing device 3 is not the savings amount request information (when a result of step S112 is NO), the billing server 2 performs the information receipt process based on the received information other than the savings amount request information (step S114). The information receipt process includes processes such as that to deduct the billing amount received from the image processing device 3 from the remaining amount of logged-in user's available funds to update and that to update the history information 19 accumulated in the storage device 13 with the logged-in user's history information.

The billing server 2 determines whether or not the logged-in user has logged out (step S115). The process is complete in response to the logged-in user's log-out operation. The billing server 2 returns to step S111 to perform the process based on the information received from the image processing device 3 repeatedly until the log-out operation is performed by the logged-in user.

Figure 14:
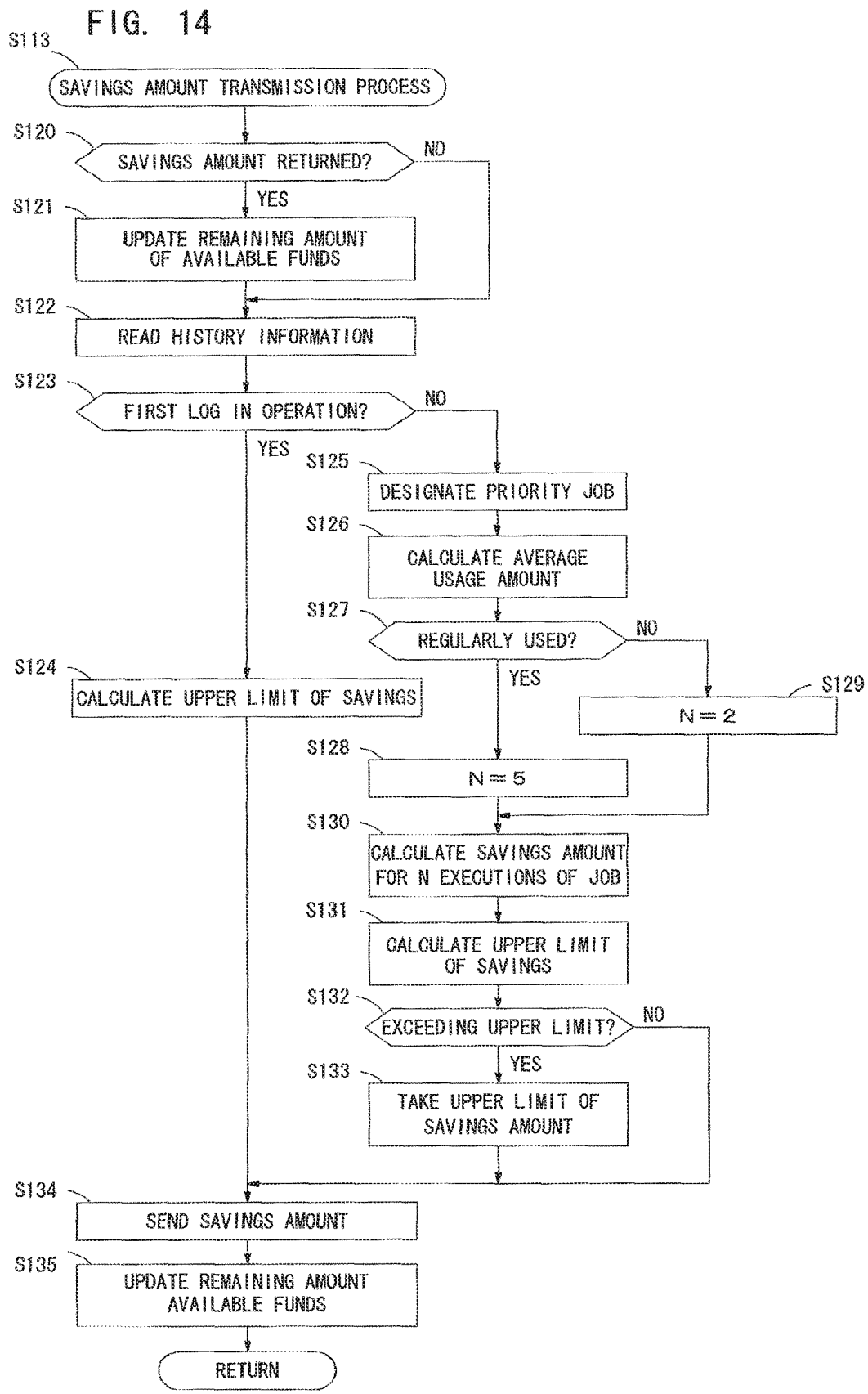
FIG. 14 is a flow diagram explaining an exemplary detailed procedure of a savings amount transmission process.

The detailed process of the savings amount transmission process is explained next. FIG. 14 is a flow diagram explaining an exemplary detailed procedure of the savings amount transmission process (step S113). The process is performed as the billing server 2 receives the savings amount request information from the image processing device 3. As starting the process, the billing server 2 determines whether or not the remaining amount of savings is returned from the image processing device 3 (step S120). When the remaining amount of savings is returned (when a result of step S120 is YES), the billing server 2 adds the returned amount to the logged-in user's available funds to update the remaining amount of available funds (step S121). When there is no remaining amount of savings returned (when a result of step S120 is NO), the process in step S121 is skipped.

The billing server 2 reads the logged-in user's history information included in the history information 19 in the storage device 13 (step S122). The billing server 2 then determines whether or not it is the first time for the logged-in user to log into the image processing device 3 (step S123). By way of example, there is no usage history of the image processing device 3 recorded in the logged-in user's history information in the first use of the image processing device 3 by the logged-in user. So, no usage history of the image processing device 3 recorded in the logged-in user's history information enables the logged-in user to be determined as the user who logs into the device for the first time.

If it is determined to be the first time for the logged-in user to log into the device (when a result of step S123 is YES), the billing server 2 calculates the upper limit of savings amount as the amount to save in advance in the image processing device 3 (step S124). To be more specific, the billing server 2 reads the remaining amount of logged-in user's available funds and the percentage of remaining amount of savings set for the logged-in user in the remaining amount information 18 to calculate the savings amount based on the read information.

To be more specific, supposing that the savings amount sent to the image processing device 3 were V, the upper limit of savings amount were Vmax, the remaining amount of logged-in user's available funds were H and the percentage of remaining amount of savings for logged-in user were R (%), the upper limit of savings amount Vmax is: Vmax, H·R (%). Therefore, the savings amount V determined in step S124 is: V=Vmax, H·R (%).

If it is determined not to be the first time for the logged-in user to log into the device (when a result of step S123 is NO), the savings amount is calculated with a process described below. Specifically, the billing server 2 designates a job which is the logged-in user's most executed job as the priority job in accordance with the logged-in user's history information (step S125) and calculates the average usage amount based on the history of the billing amount of the priority job (step S126). So, when a copy job is frequently operated by the logged-in user, for example, the average billing amount to charge for a copy job is calculated. The billing server 2 determines whether or not the image processing device 3, the originator of the savings amount request information, is the preferred device that is regularly used by the logged-in user (step S127). In accordance with the history information of the logged-in user, for example, a device, the most used by the logged-in user is determined as the preferred device and one or more devices other than the preferred device is determined as the non-preferred device.

For the image processing device 3, the preferred device of the logged-in user (when a result of step S127 is YES), the billing server 2 configures N=5 supposing that the frequency of executions of the job with the savings amount were N. For the image processing device 3, the non-preferred device of the logged-in user (when a result of step S127 is NO), the billing server 2 configures N=2 supposing that the frequency of executions of the job with the savings amount were N. Therefore, the frequency of executions of the job N is configured depending on the frequency of usage of the image processing device 3 by the logged-in user. The more usages by the logged-in user, the relatively greater value is set for frequency of executions N, and the less usage by the logged-in user, the relatively smaller value is set for frequency of executions N.

The billing server 2 calculates the savings amount equivalent to the amount consumed by N executions of the job (step S130). The savings amount that makes the average job to be executed N times is calculated based on the average usage amount of the priority job. Supposing that the average usage amount of the priority job were G, for example, the savings amount V is: $V=G \cdot N$.

The billing server 2 then calculates the upper limit of savings amount based on the remaining amount of logged-in user's available funds (step S131). The calculation method to be used is the same one as described above. Supposing that the upper limit of savings amount were Vmax, the remaining amount of logged-in user's available funds were H and the percentage of remaining amount of savings for logged-in user were R (%), the upper limit of savings amount Vmax is: $Vmax=H \cdot R$ (%). The billing server 2 determines whether or not the savings amount V calculated in step S130 exceeds the upper limit of savings amount Vmax calculated in step S131 (step S132). For the savings amount V exceeding the upper limit of savings amount Vmax (when a result of step S132 is YES), the billing server 2 takes the upper limit of savings amount Vmax as the savings amount V (step S133). So, the savings amount V is: V=Vmax. For the savings amount V less than the upper limit of savings amount Vmax (when a result of step S132 is NO), the billing server 2 takes the amount calculated in step S130 as the savings amount V. So, the savings amount V is: $V=G \cdot N$.

The billing server 2 sends the savings amount determined as a result of above-described process to the image processing device 3 (step S134). After sending the savings amount, the billing server 2 deducts the amount equivalent to the savings amount sent to the image processing device 3 from the remaining amount of the logged-in user's available funds and updates the remaining amount of available funds (step S135). The savings amount transmission process (step S113) is thus complete.

The billing server 2 performs the above-described processes, thereby calculating the amount to save in advance in the image processing device 3 from the remaining amount of funds available for the logged-in user and sending the savings amount thereby calculated to the image processing device 3 in response to the request from the image processing device 3 while the data communication between the image processing device 3 and the billing server 2 is available. The calculated savings amount may make the job to be executed a predetermined times configured in accordance with the frequency of usage of the image processing device 3 by the logged-in user. The amount to save in advance in each of the plurality of image processing devices 3 depends on the frequency of usage by the logged-in user.

Figure 15:
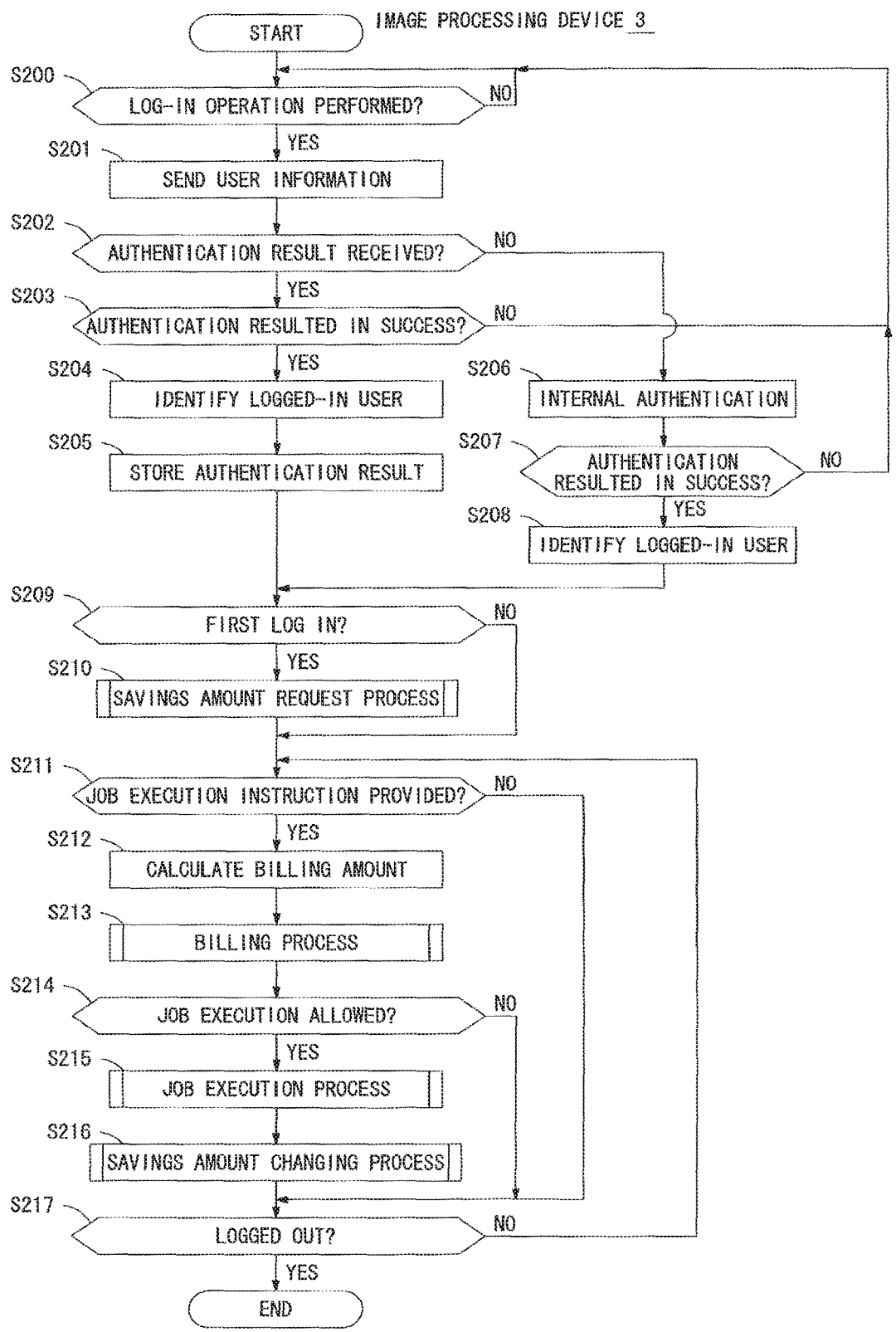
FIG. 15 is a flow diagram explaining an exemplary main procedure of a process performed by the image processing device.

Next, the operation of the image processing device 3 is explained. FIG. 15 is a flow diagram explaining an exemplary main procedure of a process performed by the image processing device 3. The process is performed in response to execution of the program 40 by the CPU 31 of the image processing device 3. As shown in FIG. 15, upon start of this process, the image processing device 3 is put into a waiting state until the log-in operation is performed by the user (step S200). The log-in operation is performed by the user (when a result of step S200 is YES), and the image processing device 3 obtains the user information containing the user ID and password in response to the user's operation to send to the billing server 2 (step S201). The image processing device 3 waits for receipt of the authentication result from the billing server 2 for the predetermined period of time after sending the user information (step S202).

After receiving the authentication result (when a result of step S202 is YES), the image processing device 3 determines whether or not the user authentication in the billing server 2 results in success (step S203) and returns to step S200 when the user authentication results in failure (when a result of step S203 is NO), whereas identifies the logged-in user (step S204) and stores the result of the authentication executed by the billing server 2 in the storage device 38 (step S205) when the user authentication results in success (when a result of step S203 is YES). The information stored in step S205 includes the user ID and password, the function restriction information and the privileged user flag set for the logged-in user. Further, the billing map set for the logged-in user is stored in the billing map storage part 42. The process moves onto step S209.

When not receiving the authentication result from the billing server 2 (when a result of step S202 is NO), the image processing device 3 performs internal authentication by referring to the accumulated authentication results in the authentication result storage part 41 (process P206). It is checked whether or not there is any logged-in user previously authenticated in success with the same combination of the user ID and password entered through the log-in operation by the user. The image processing device 3 determines whether or not the authentication with the internal authentication results in success (process P207) and returns to step S200 when the authentication with the internal authentication results in failure (when a result of step S207 is NO). The image processing device 3 identifies the logged-in user based on the accumulated authentication results (process P208) when the authentication with the internal authentication results in success (when a result of step S207 is YES). The image processing device 3 then moves on to step S209.

The image processing device 3 determines whether or not it is the first time for being logged in by the logged-in user (process P209). The image processing device 3 performs the savings amount request process (process P210) for the first log-in. For being logged in by the logged-in user more than once, the savings amount request process in step S210 is not performed as the savings amount has already been stored for the logged-in user.

Figure 16:
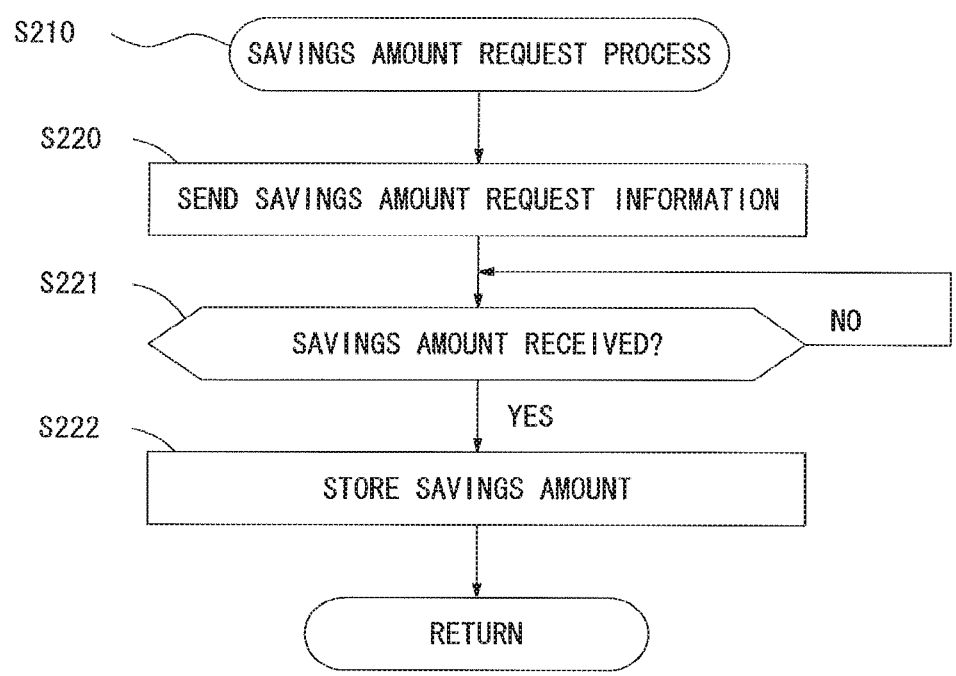
FIG. 16 is a flow diagram explaining an exemplary detailed procedure of a savings amount request process performed by the image processing device.

FIG. 16 is a flow diagram explaining an exemplary detailed procedure of the savings amount request process (step S210). As shown in FIG. 16, upon the start of the process, the image processing device 3 sends the savings amount request information to the billing server 2 (step S220). The image processing device 3 is put into a waiting state to receive the savings amount from the billing server 2 (step S221). As receiving the savings amount (when a result of step S221 is YES), the image processing device 3 stores the received savings amount in accordance with the logged-in user in the savings amount storage part 43 (step S222). The savings amount request process is thus complete.

Back to the flow diagram of FIG. 15, the image processing device 3 determines whether or not the job execution instruction is given by the logged-in user (step S211). When no job execution instruction is given (when a result of step S211 is NO), the image processing device 3 moves on to step S217. When the job execution instruction is given (when a result of step S211 is YES), the image processing device 3 calculates the billing amount necessary for execution of the job by referring to the billing map corresponding to the detailed information of the job specified by the logged-in user (step S212) to perform billing process (step S213).

Figure 17:
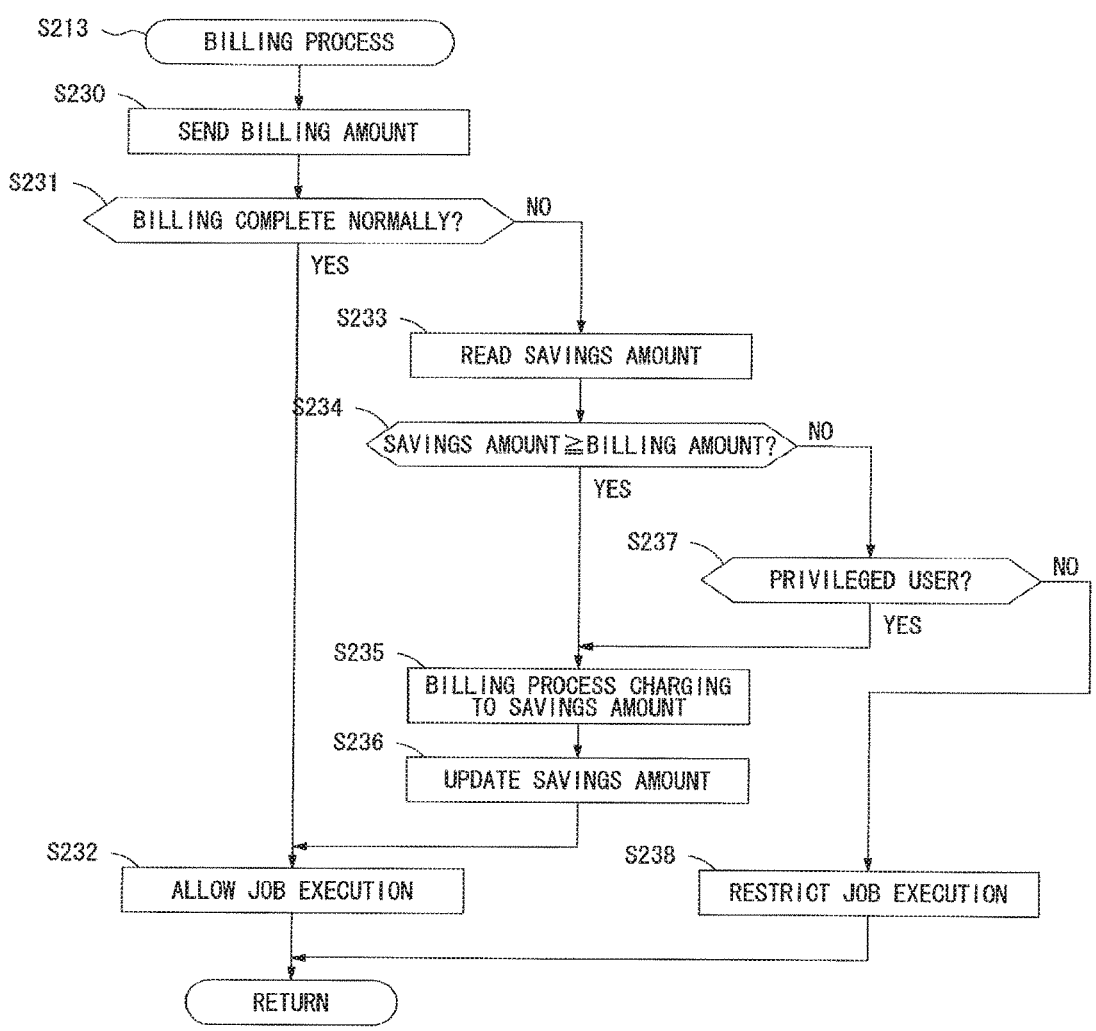
FIG. 17 is a flow diagram explaining an exemplary detailed procedure of a billing process performed by the image processing device.

FIG. 17 is a flow diagram explaining an exemplary detailed procedure of the billing process (step S213). As starting the process, the image processing device 3 sends the billing amount calculated in step S212 to the billing server 2 (step S230). The image processing device 3 is put into a waiting state to receive a report indicating that the billing is complete normally from the billing server 2 for a predetermined period of time after sending the billing amount (step S231).

As receiving the report indicating that the billing is complete normally from the billing server 2 (when a result of step S231 is YES), the image processing device 3 allows the execution of the job specified by the logged-in user (step S232).

When not receiving the report indicating that the billing is complete normally from the billing server 2 in the predetermined period of time (when a result of step S231 is NO), the image processing device 3 determines that data communication with the billing server 2 is not available and moves on to step S233. The image processing device 3 reads the savings amount in accordance with the logged-in user in the savings amount storage part 43 (step S233) and determines whether or not the savings amount is in excess of the billing amount (step S234). For the savings amount exceeding the billing amount (when a result of step S234 is YES), the image processing device 3 performs the billing process to charge to the savings amount (step S235) and updates the savings amount in accordance with the logged-in user (step S236). The image processing device 3 then allows the execution of the job (step S232).

For the savings amount less than the billing amount (when a result of step S234 is NO), the image processing device 3 determines whether the logged-in user is the privileged user (step S237). If the logged-in user is the privileged user (when a result of step S237 is YES), the image processing device 3 performs the billing process to charge to the savings amount (step S235) and updates the savings amount in accordance with the logged-in user (step S236). In this update process, a negative amount (deficit) on the logged-in user's savings amount is created in response to the billing process. The image processing device 3 then allows the execution of the job (step S232).

If the logged-in user is not the privileged user (when a result of step S237 is NO), the image processing device 3 restricts the execution of the job (step S238). The billing process (step S213) is thus complete.

Back to FIG. 15, the image processing device 3 determines whether or not the execution of the job is allowed through the above-described billing process (step S213) (step S214). As the execution of the job is allowed (when a result of step S214 is YES), the image processing device 3 performs a job execution process (step S215).

Figure 18:
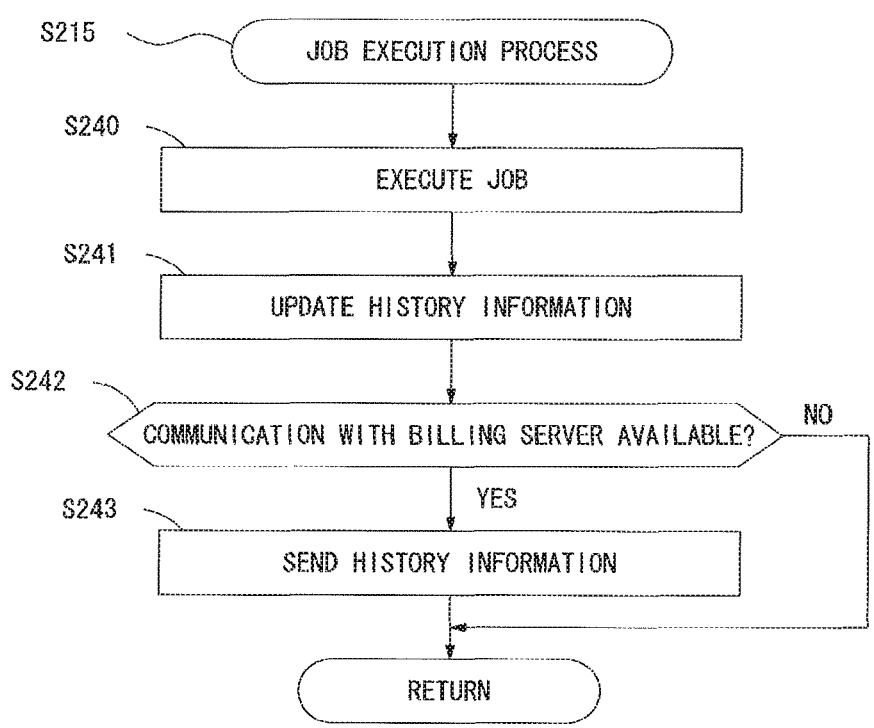
FIG. 18 is a flow diagram explaining an exemplary detailed procedure of a job execution process performed by the image processing device.

FIG. 18 is a flow diagram explaining an exemplary detailed procedure of the job execution process (step S215). As starting the process, the image processing device 3 executes the job specified by the logged-in user (step S240). After executing the job, the image processing device 3 generates history information and updates the logged-in user's accumulated history information in the history information storage part 44 (step S241). The image processing device 3 determines whether or not data communication with the billing server 2 is available (step S242). When data communication is available, the logged-in user's history information is sent to the billing server 2 (step S243). When data communication with the billing server 2 is failed to be established, the image processing device 3 does not send the history information (step S243). The process to execute the job (step S215) is thus complete.

Back to the flow diagram of FIG. 15, as the above-described job execution process (step S215) is complete, the image processing device 3 executes a process to change the savings amount (step S216).

Figure 19:
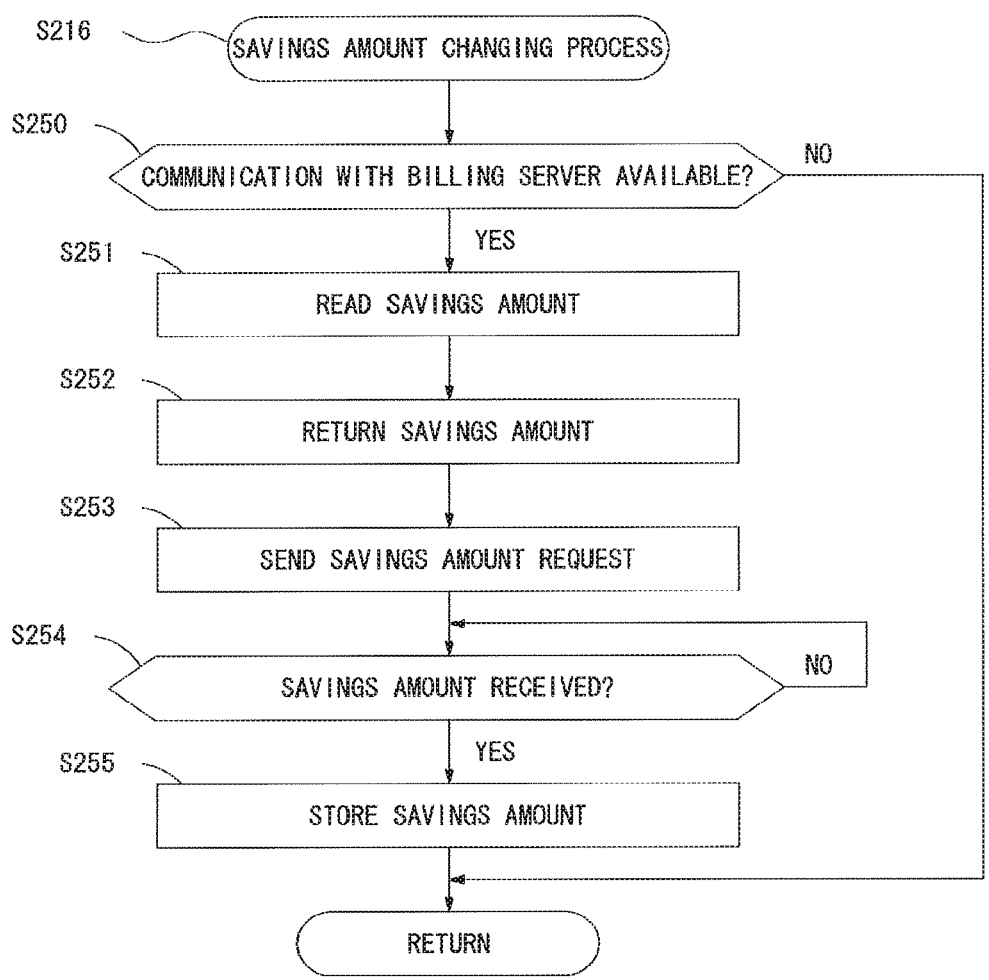
FIG. 19 is a flow diagram explaining an exemplary detailed procedure of a savings amount changing process performed by the image processing device.

FIG. 19 is a flow diagram explaining an exemplary detailed procedure of the savings amount changing process (step S216). Upon the start of the process, the image processing device 3 determines whether or not data communication with the billing server 2 is available (step S250). The image processing device 3 completes the process without making any operation when data communication is not available. When data communication is available (when a result of step S250 is YES), the image processing device 3 reads the logged-in user's savings amount (step S251) and returns the savings amount to the billing server 2 (step S252). The logged-in user's savings amount becomes temporarily zero at a time. The image processing device 3 again sends the savings amount request information to the billing server 2 (step S253). The image processing device 3 is put into a waiting state to receive the savings from the billing server 2 (step S254). In response to receipt of the savings amount from the billing server 2 (when a result of step S254 is YES), the image processing device 3 stores the received savings amount in accordance with the logged-in user in the savings amount storage part 43 (step S255). The savings amount changing process is thus complete.

Back to the flow diagram of FIG. 15 again, the image processing device 3 determines whether or not a log-out operation is performed by the logged-in user (step S217). When the log-out operation is performed, a log-out process is performed and the process is complete. When the log-out operation is not performed by the logged-in user (when a result of step S217 is NO), the image processing device 3 returns to step S211 to perform the process in response to the job execution instruction by the logged-in user repeatedly.

The process described above is performed by the image processing device 3, so as to perform the billing process using the savings amount saved in advance for the logged-in user and allow execution of the job even when the data communication between the image processing device 3 and the billing server 2 is not available due to a trouble such as the network trouble or the problem with the server when the job execution instruction is given by the logged-in user. The user may use the image processing device 3 even in occurrence of the trouble such as the network trouble or the problem with the server, and the user friendliness is improved.

The image processing system 1 in the present preferred embodiment is configured to include the image processing device 3 executes the job and the billing server 2 performs the billing process in response to execution of the job by image processing device 3 connected via the network 4 as described above. On the image processing system 1, the billing server 2 includes the remaining amount management part 21 for managing the remaining amount of funds available for each user, the user authentication part 22 for authenticating the user based on the user information received from the image processing device 3 and the savings amount transmission part 23 for determining the savings amount to save in advance in the image processing device 3 based on the remaining amount of the available funds of the logged-in user (authenticated user) who is successfully authenticated by the user authentication part 22 and sending the savings amount to the image processing device 3. The image processing device 3 includes the savings amount storage part 43 for storing therein the savings amount received from the savings amount transmission part 23 in accordance with the logged-in user, the job execution control part 53 for executing the job with the job execution instruction by the logged-in user and the billing processing part 54 for performing the billing process to charge the logged-in user with execution of the job by the job execution control part 53. The billing processing part 54 is configured to perform the billing process by deducting the billing amount charged for execution of the job from the savings amount of the logged-in user in the savings amount storage part 43 when data communication with the billing server 2 is failed to be established.

Therefore, even when the image processing device 3 cannot establish data communication for billing process with the billing server 2 like in case of occurrence of the problem with the billing server 2 or the network trouble, it is capable of executing the job through the billing process using the savings amount saved in advance for the logged-in user. So, the configuration allows effectively preventing an inconvenience that the logged-in user may not use the image processing device 3 even with the sufficient amount of available funds recorded in the billing server 2 and improves the user friendliness.

The remaining amount management part 21 in the billing server 2 is configured to deduct the amount to save received from the savings transmission part 23 from the remaining amount of funds available for the logged-in user and manage. Even when the billing server 2 manages the plurality of image processing devices 3, it is enabled to determine the amount to save based on the remaining amount of available funds at transmission of the savings amount for the logged-in user to each of the plurality of image processing devices 3. So, it may prevent from having total amount of the savings amount saved in each image processing device 3 exceeding the remaining amount of the available funds of the logged-in user. The remaining amount of available funds of each user may be appropriately managed.

As data communication with the billing server 2 is allowed to be established, the billing processing part 54 of the image processing device 3 sends the savings amount in accordance with the logged-in user in the savings amount storage part 43 to the billing server 2 to return and updates the savings amount in the savings amount storage part 43 by receiving a new savings amount from the billing server 2. The savings amount saved in the image processing device 3 may be lowered as the remaining amount of the funds available for the logged-in user managed by the billing server 2 lowered.

The remaining amount management part 21 of the billing server 2 updates the remaining amount of available funds by adding the savings amount received from the image processing device 3 to the logged-in user's available funds. As the remaining amount of the funds available for the logged-in user is updated by the remaining amount management part 21, the savings transmission part 23 again determines the amount to save in advance in the image processing device 3 based on the updated remaining amount of available funds and sends the determined savings amount to the image processing device 3. The configuration allows the savings amount saved in the image processing device 3 being controlled properly to the appropriate amount.

The savings transmission part 23 determines the savings amount for the logged-in user with limits of not larger than the amount generated with the predetermined percentage of the logged-in user's available funds, so it can prevent to have the savings amount in the image processing device 3 too large for the remaining amount of available funds. The savings transmission part 23 determines the savings amount sufficient for the job to be executed the predetermined number of times based on the average billing amount (average usage amount) of a job charged to the logged-in user. Therefore, the job may be executed the predetermined number of times in the image processing device 3 even in occurrence of the problem with the server or the network trouble. The predetermined number is configured in accordance with the frequency of usage of the image processing device 3 by the logged-in user. The image processing device 3 more often used by the logged-in user may save larger amount than other image processing devices 3.

When the billing processing part 54 fails to establish data communication with the billing server 2, the image processing device 3 restricts execution of the job that consumes the amount exceeding the savings amount corresponding to the logged-in user in the savings amount storage part 43. As a result, it may prevent execution of the job consumes the amount exceeding the remaining amount of logged-in user's available funds when data communication between the image processing device 3 and the billing server 2 is not available. In the present preferred embodiment, for the logged-in user, the privileged user, execution of the job consumes the amount exceeding the savings amount corresponding to the logged-in user in the savings amount storage part 43 is allowed even when data communication between the image processing device 3 and the billing server 2 is failed to be established by the billing processing part 54. Therefore, for the logged-in user, the privileged user, the job is allowed to be executed even with a decrease in the savings amount. That makes the user friendliness improved.

(Modifications)

While the preferred embodiment of the present invention has been described above, the present invention is not intended to be confined to the details shown above.

In the above-described preferred embodiment, a condition under which the billing server 2 includes the authentication function to authenticate a user trying to use the image processing device 3. However, this is not the only example of the user authentication. As another example, the user authentication may be performed by the billing server and another authentication server. That is, a condition under which the authentication server and the billing server work together to realize the variety of functions on the billing server 2 as described in the above preferred embodiment.

What is claimed is:

1. A management server that manages an image processing device, said management server comprising:
    a storage device that stores identification information for identifying a user and an upper usage associated with said identification information;
    a receiver that receives information relating to an amount required for execution of a job, being executed at said image processing device and input by the user whose identification information is stored, from said image processing device with which communication is established;
    a processor that performs a process to deduct said required amount from said upper usage and updates said upper usage when said required amount is received; and
    a transmitter that transmits information showing a completion of said deducting process to said image processing device, with which communication is established, to give a permission on execution of the job at said image processing device,
    wherein the processor determines a usable quantity by associating with said image processing device based on said upper usage to get the permission on execution of the job at said image processing device without communication with said management server when the communication with said image processing device cannot be established;
    wherein said management server manages multiple image processing devices, and
    the processor determines said usable quantity for each of said multiple image processing devices
    said receiver receives history information relating to a history of execution of the job associated with said identification information from each of said multiple image processing devices, and
    the processor determines one or more image processing devices highly used by said user from among said multiple image processing devices based on said history information, and allocates a larger usable quantity to said one or more determined highly-used image processing device than the other image processing devices.

2. The management server according to claim 1, wherein the processor further specifies a type of a job that is executed by said user the most in accordance with said history information, and determines the usable quantity based on the specified type of job.

3. The management server according to claim 1, wherein the upper usage is an available amount of money that is available for said user for execution of the job,
    when said management server is allowed to establish communication with said image processing devices, the receiver receives information relating to an amount required for execution of a job received from said image processing devices when said image processing devices receives a job execution instruction by said user, wherein
    the processor determines if the amount required for execution of said received job is within available funds corresponding to said user, and performs a billing process of deducting the amount required for execution of said received job from the available funds when the amount required for execution of said received job is within the available funds, and
    the transmitter sends a notification to each of said image processing devices that said billing process is complete.

4. The management server according to claim 1, wherein said upper usage is an available amount of money that is available for said user for execution of the job, and
    the information relating to said usable quantity is used for a process at each of said image processing devices to determine if the amount required for execution of said job which is instructed by said user at each of said image processing devices is within available funds corresponding to said user when said image processing devices does not establish communication with said management server.

5. A non-transitory computer readable recording medium on which a program is recorded executable by a computer serving as a management server, said management server managing an image processing, said program causing said computer to execute the steps of:
    storing identification information, using a storage device, for identifying a user an upper usage associated with said identification information;
    receiving information from said image processing device with which communication is established, using a receiver, relating to an amount required for execution of a job being executed at said image processing device and input by the user whose identification is stored,
    performing, using a processor, a process to deduct said required amount from said upper usage and updates said upper usage when said required amount is received; and
    transmitting, using a transmitter, information showing a completion of said deducting process to said image processing device, with which communication is established, to give a permission on execution of the job at said image processing device, wherein a determination of a usable quantity is made by the processor by associating with said image processing device based on said upper usage to get the permission on execution of the job at said image processing device without communication with said management server when the communication with said image processing device cannot be established
    wherein said management server manages multiple image processing devices, and
    determines said usable quantity for each of said multiple image processing devices
    receives history information relating to a history of execution of the job associated with said identification information from each of said multiple image processing devices, and
    determines one or more image processing devices highly used by said user from among said multiple image processing devices based on said history information, and allocates a larger usable quantity to said one or more determined highly-used image processing device than the other image processing devices.

6. The non-transitory computer readable recording medium according to claim 5, wherein said management server manages multiple image processing devices; and
  a determination of said usable quantity for each of said multiple image processing devices is made by the processor.

7. The non-transitory computer readable recording medium according to claim 6, wherein
  receiving history information, using the receiver, relating to a history of execution of the job associated with said identification information from each of said multiple image processing devices, and
  one or more image processing devices highly used by said user is determined from among said multiple image processing devices based on said history information, and the larger usable quantity is allocated to said one or more determined highly-used image processing device than the other image processing devices in said step (b).

8. The non-transitory computer readable recording medium according to claim 7, wherein
  a type of a job that is executed by said user the most in accordance with said history information is specified, and the usable quantity is determined based on the specified type of job in said step (b).

9. The non-transitory computer readable recording medium according to claim 5, wherein
  the upper usage is an available amount of money that is available for said user for execution of the job, when said management server is allowed to establish communication with said image processing devices, and
  said program causing said computer to further execute the steps of:
  (d) receiving information relating to the amount required for execution of a job received from said image processing devices when said image processing devices receives a job execution instruction by said user;
  (e) determining if the amount required for execution of said received job is within available funds corresponding to said user, and performing a billing process of deducting the amount required for execution of said received job from the available funds; and
  (f) sending a notification to each of said image processing devices that said billing process is complete.

10. The non-transitory computer readable recording medium according to claim 5, wherein
  said upper usage is an available amount of money that is available for said user for execution of the job, and
  the information relating to said usable quantity is used for a process at each of said image processing devices to determine if the amount required for execution of said job which is instructed by said user at each of said image processing devices is within available funds corresponding to said user when each of said image processing devices does not establish communication with said management server.

* * * * *